(12) United States Patent
Jackson, Jr.

(10) Patent No.: US 11,279,327 B1
(45) Date of Patent: Mar. 22, 2022

(54) VEHICLE SENSOR CALIBRATION TARGET ALIGNMENT SYSTEM

(71) Applicant: Richard L. Jackson, Jr., Grove City, OH (US)

(72) Inventor: Richard L. Jackson, Jr., Grove City, OH (US)

( * ) Notice: Subject to any disclaimer, the term of this patent is extended or adjusted under 35 U.S.C. 154(b) by 77 days.

(21) Appl. No.: 17/012,296

(22) Filed: Sep. 4, 2020

(51) Int. Cl.
*B60S 5/00* (2006.01)
*G01B 11/275* (2006.01)
*G01B 11/27* (2006.01)

(52) U.S. Cl.
CPC .............. *B60S 5/00* (2013.01); *G01B 11/27* (2013.01); *G01B 11/275* (2013.01)

(58) Field of Classification Search
CPC ...... G01B 5/0025; G01B 11/2755; B60S 5/00
USPC ........................................................... 33/288
See application file for complete search history.

(56) References Cited

U.S. PATENT DOCUMENTS

| | | | |
|---|---|---|---|
| 6,542,840 B2 | 4/2003 | Okamoto et al. | |
| 7,538,864 B2 * | 5/2009 | Golab | G01B 11/2545 356/139.09 |
| 8,448,342 B2 | 5/2013 | Nobis et al. | |
| 2006/0090356 A1 | 5/2006 | Steiff | |
| 2010/0318307 A1 | 12/2010 | Schommer et al. | |
| 2013/0110314 A1 | 5/2013 | Stieff | |
| 2013/0325252 A1 | 12/2013 | Schommer et al. | |
| 2018/0100783 A1* | 4/2018 | Stieff | G01S 7/4052 |
| 2019/0064320 A1 | 2/2019 | Zack et al. | |
| 2019/0031482 A1 | 10/2019 | Lawrence et al. | |
| 2019/0331482 A1 | 10/2019 | Lawrence et al. | |
| 2019/0376640 A1 | 12/2019 | Innes | |
| 2020/0039436 A1 | 2/2020 | Ferreira et al. | |
| 2020/0058987 A1 | 2/2020 | Pelletti et al. | |
| 2020/0074675 A1 | 3/2020 | Cejka et al. | |
| 2020/0096605 A1* | 3/2020 | Okubo | G01S 7/4021 |
| 2020/0278198 A1* | 9/2020 | Torri | G01B 11/2755 |
| 2020/0348129 A1* | 11/2020 | DeBoer | G01B 11/2755 |
| 2021/0279910 A1* | 9/2021 | Corghi | G06T 7/70 |
| 2021/0318117 A1* | 10/2021 | Strege | G06K 7/1417 |

OTHER PUBLICATIONS

Written Opinion of the International Searching Authority for PCT/US21/39148 established by the ISA/US completed on Sep. 24, 2021.

* cited by examiner

*Primary Examiner* — George B Bennett
(74) *Attorney, Agent, or Firm* — Goldstein Law Offices, P.C.

(57) ABSTRACT

A target alignment system for calibrating a safety sensor mounted on a vehicle with front and rear wheels by locating an optimum target position upon a horizontal surface for accurate calibration of the sensor. The target alignment system comprises a plurality of visual guide projectors and a pair of target assemblies which project a visible guide line perimeter around the vehicle, the perimeter including parallel longitudinal lines on either side of the vehicle, a lateral alignment guide line crossing the longitudinal lines in front of the vehicle, and a center guide line colinear with the vehicle center line. The front and rear wheels of the vehicle are longitudinally aligned causing the vehicle thrust line to match the vehicle center line. One of the visual guide projectors projects a transverse line across the center guide line, creating an intersection point which marks the optimum target position.

14 Claims, 23 Drawing Sheets

VEHICLE SENSOR CALIBRATION TARGET ALIGNMENT SYSTEM

TECHNICAL FIELD

The present disclosure relates generally to an apparatus and method for calibrating a vehicle-mounted sensor. More particularly, the present disclosure relates to a target alignment system for placing a calibration target and aligning a vehicle's wheels.

BACKGROUND

Automated Driver Assisted Safety Systems (ADAS) increase car and road safety by detecting obstacles and mitigating driver error. For example, collision avoidance systems use radar, LIDAR, cameras, or other sensing devices to scan for obstacles ahead of a vehicle in order to prevent the vehicle from colliding with these obstacles in the event of driver error. For ADAS systems to function correctly, each of these sensors must be accurately calibrated. Furthermore, a vehicle's steering and suspension must be correctly aligned. For example, a properly calibrated collision avoidance system is able to accurately locate obstacles and predict the path of the vehicle as it travels, based on the steering angle of the wheels, and the speed of the vehicle. Improperly calibrated sensors may cause the ADAS system to miscalculate the true path of the vehicle or the distance between the vehicle and the obstacles, resulting in the ADAS system failing to detect potential collisions.

However, conventional calibration systems and methods have several key disadvantages. ADAS systems are typically calibrated by placing vehicles on a specialized flat surface, such as a level floor free of irregularities, with precisely positioned calibration markings which cannot easily be moved or adjusted. Sensors, such as cameras and radars, are calibrated by placing specialized targets within sensing range along the vehicle's center line, with the assumption made that the vehicle's thrust angle will match the vehicle's center line. Conventional systems require dedicated floor space which cannot easily be used for other purposes, thus making them impractical for use in small or crowded service facilities. Permanently affixed markings on the floor can also be damaged or obscured. Furthermore, standard methods for determining the vehicle's centerline, such as by suspending plumb bob from an emblem at the front or rear of the vehicle, are often imprecise. Due to the high speed of vehicles and the need to accurately detect obstacles when they are far ahead of the vehicle, even small degree of misalignment of an ADAS sensor may result in serious miscalculations. Lastly, conventional systems often utilize complex devices which are time consuming and labor intensive to set up and dismantle.

As a result, there is an urgent need for an improved, easy to use target alignment system which is capable of accurately determining a vehicle's centerline and ensuring the thrust angle matches the centerline, locating the optimum position for the placing sensor calibration targets, and adapting to irregularities on shop floors or other surfaces.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an apparatus for assisting in calibrating a vehicle safety sensor by precisely locating an optimum target position for accurate calibration of the sensor. Accordingly, the present disclosure provides a target alignment system which produces a visible guide line perimeter around a vehicle, including a center guide line which passes centrally and longitudinally through the vehicle. The optimum target position is then located along the center guide line and marked by intersecting the center guide with a transverse guide line, allowing the calibration target to be accurately placed.

It is another aspect of an example embodiment in the present disclosure to provide a target alignment system which allows the visible guide line perimeter to be accurately and quickly deployed on any substantially flat horizontal surface. Accordingly, the target alignment system comprises a plurality of wheel-mounted visual guide line projectors, a pair of target assemblies, a lateral guide line projector, a center guide line projector, a distance measuring projector, a thrust line target, and a transverse visual guide projector. The wheel-mounted visual guides project a pair of longitudinal guide lines upon the horizontal surface along the sides of the vehicle. Each of the target assemblies is positioned upon the horizontal surface ahead of the vehicle and is aligned with one of the longitudinal guide lines. The lateral guide line projector projects a lateral guide line upon the horizontal surface which is perpendicular to the longitudinal guide lines and laterally aligns the two target assemblies. The distance measuring projector projects a distance measuring line between the target assemblies which determines the distance between the longitudinal guide lines. The thrust line target is placed upon the horizontal surface intersecting the distance measuring line at a midpoint which is equidistant between the longitudinal guide lines. The center guide line projector is aligned with the thrust line target and projects the center guide line upon the horizontal surface which is colinear with the vehicle center line. The transverse guide line projector is positioned along one of the longitudinal guide lines at a point marking a calibration distance, to project the transverse guide line which perpendicularly intersects the center guide line to mark the optimum target position.

It is yet another aspect of an example embodiment in the present disclosure to provide a target alignment system which allows a thrust line of the vehicle to be matched with the vehicle center line. Accordingly, one of the wheel-mounted visual guide line projectors is attached to each of the front wheels. Each of the front wheels is longitudinally aligned with the corresponding rear wheel, when the longitudinal guide lines associated with the front and rear wheels form a colinear convergence upon the horizontal surface. Once the front and rear wheels on either side of the vehicle are longitudinally aligned, the resulting thrust line is located between the longitudinal guide lines and is colinear with the vehicle center line.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
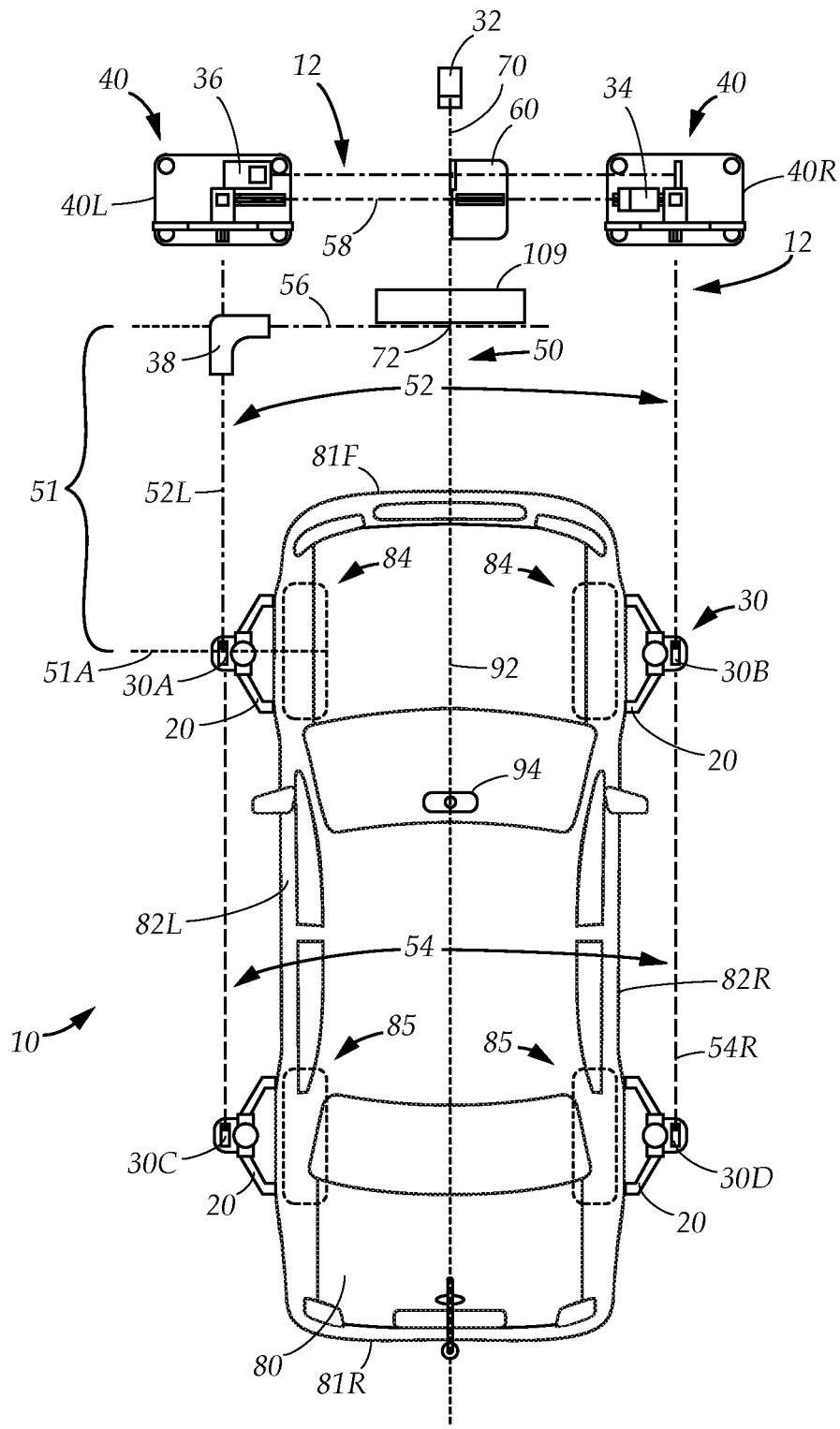
FIG. 1A is a diagrammatical top view depicting a target alignment system which produces a visible guide line perimeter to optimally place a calibration target for calibrating a vehicle-mounted sensor, in accordance with an embodiment in the present disclosure.
Figure 1B:
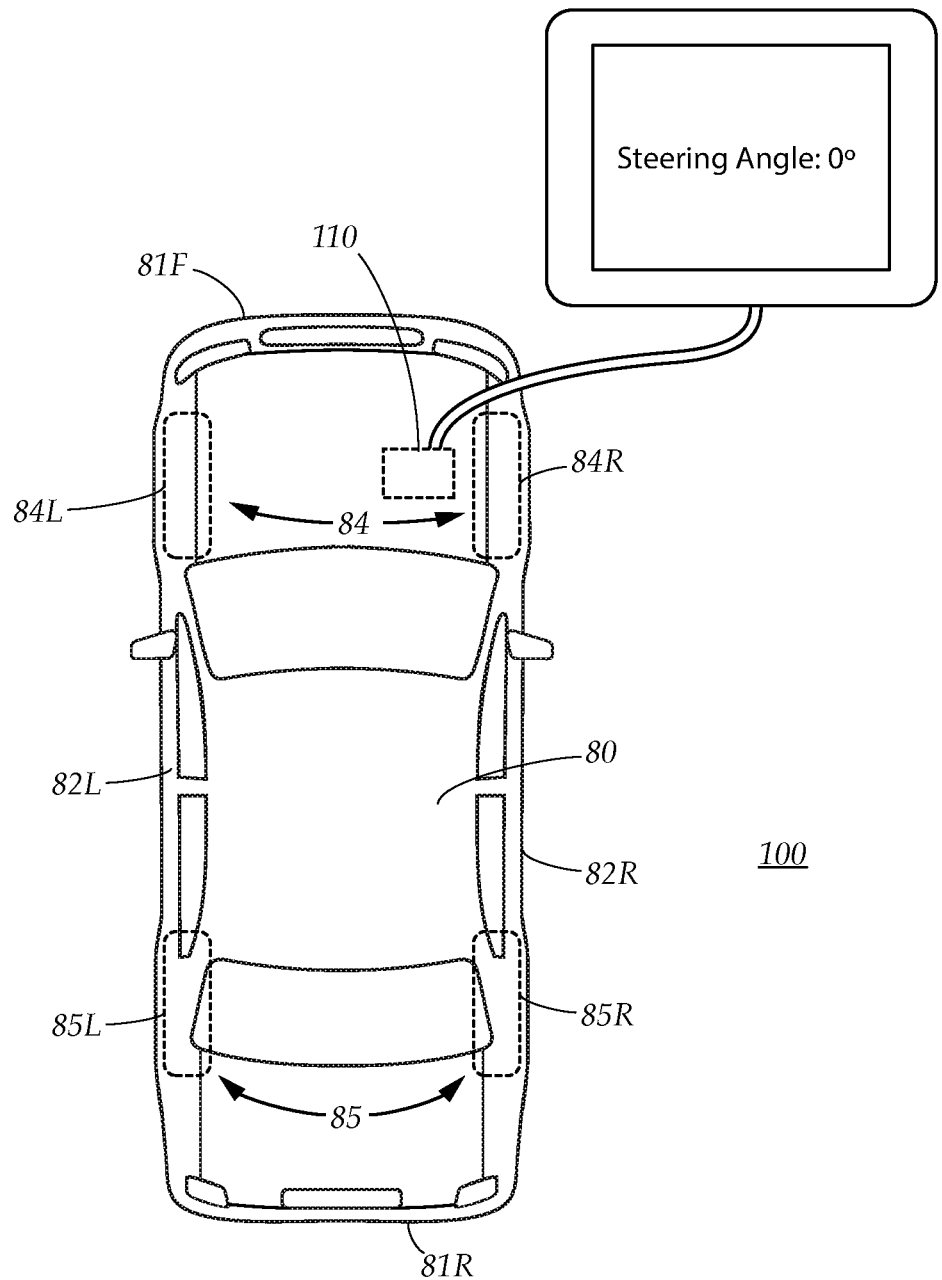
FIG. 1B is a diagrammatical top view of a vehicle, depicting the front wheels being set to a steering angle of zero degrees using a steering angle sensor, in accordance with an embodiment in the present disclosure.

FIGS. 1A-B illustrate a target alignment system 10 for calibrating a sensor 94 mounted on a vehicle 80. In a preferred embodiment, the sensor 94 is a safety device used in an Automated Driver Assisted Safety system (ADAS), such as a camera, or a radar or LIDAR sensing device. The sensor 94 is calibrated using a calibration target 109. The vehicle 80 is a conventional wheeled vehicle, such as an automobile or truck, having a vehicle front 81F, a vehicle rear 81R, a vehicle left side 82L, a vehicle right side 82R, a pair of front wheels 84, and a pair of rear wheels 85. Where the vehicle 80 has four wheels, the front wheels 84 comprise a first front wheel 84L and a second front wheel 84R, while the rear wheels 85 comprise a first rear wheel 85L and a second rear wheel 85R. The target alignment system 10 operates while the vehicle 80 is positioned upon a horizontal surface 100, such as the ground or a floor. In order for the sensor 94 to be calibrated correctly during a testing, diagnostic, or maintenance procedure, the sensor must be placed at an optimum target position 72 upon the horizontal surface 100. The target alignment system 10 allows a user to quickly and accurately locate the optimum target position 72. Furthermore, the target alignment system 10 allows the user to identify and compensate for irregularities in the horizontal surface 100 which may otherwise interfere with the successful calibration of the sensor 94.

Figure 2:
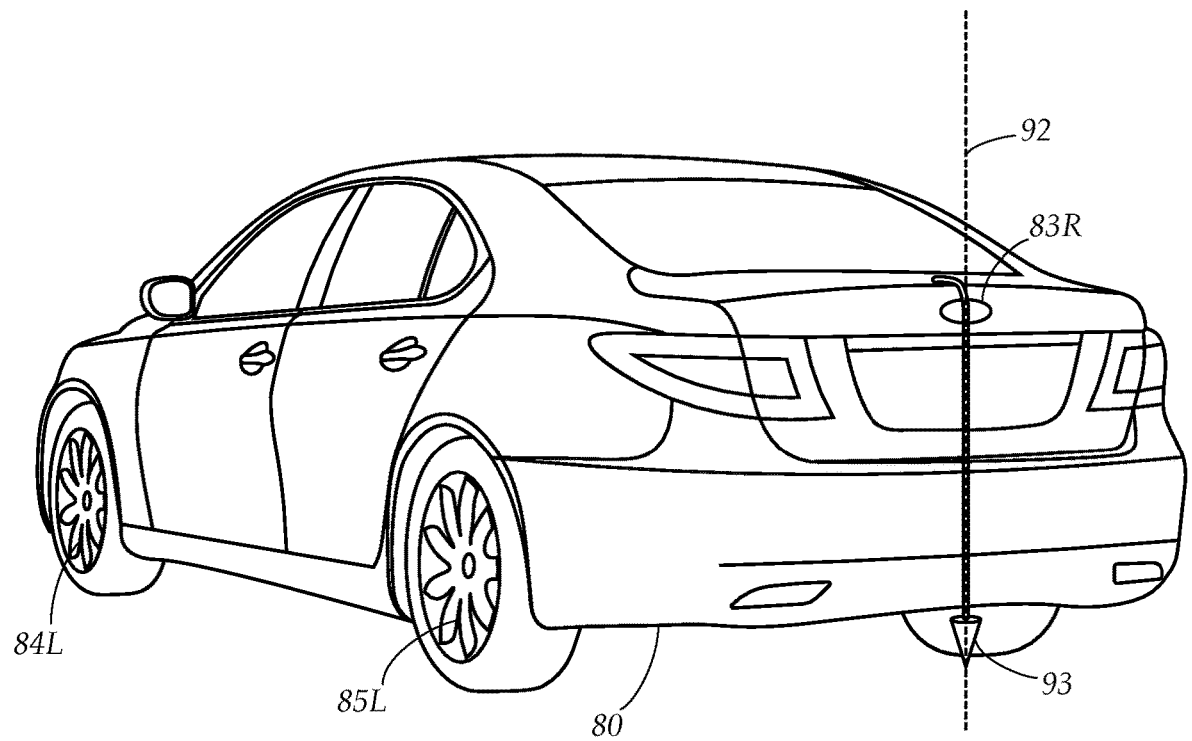
FIG. 2 is a diagrammatical rear perspective view of the vehicle, showing a conventional method for locating a center line using a plumb bob attached to the vehicle rear, in accordance with an embodiment in the present disclosure.

Referring to FIG. 2 while continuing to refer to FIGS. 1A-B, the optimum target position 72 is located along a vehicle center line 92, and is separated from the vehicle 80 or other starting reference point 51A thereon by a calibration distance 51. The length of the calibration distance 51 is dependent upon the characteristics of the sensor 94. For example, the length of the calibration distance 51 may be found within documentation provided by the manufacturer of the sensor 94 or the vehicle 80, and may correspond to a reference distance around which the calibration or diagnostic procedures for the sensor 94 are performed. For example, the documentation for the sensor 94 may dictate that the calibration target 109 be separated from the sensor 94 or another reference point on the vehicle, such as a bumper or wheel axle, by no more than three meters. The vehicle center line 92 runs longitudinally through the vehicle 80 and may be equidistant between the first front and first rear wheels 84L, 85L and the second front and second rear wheels 84R, 85R. A conventional but imprecise method for locating the vehicle center line involves suspending a plumb bob 93 from an emblem 83R located at the vehicle rear 81R, such that the plumb bob 93 hangs above the horizontal surface 100.

The target alignment system 10 comprises a plurality of wheel-mounted visual guide projectors, a pair of target assemblies 40, a center visual guide projector, a lateral alignment visual guide projector 34, and a transverse visual guide projector 38. The target alignment system 10 may additionally comprise a distance measuring projector 36. The wheel-mounted visual guide projectors are detachably mounted to the front wheels 84 and rear wheels 85 of the vehicle 80. In a preferred embodiment, the wheel-mounted visual guide projectors include a first front visual guide projector 30A which attaches to the first front wheel 84L, a second front visual guide projector 30B which attaches to the second front wheel 84R, a first rear visual guide projector which attaches to the first rear wheel 85L, and a second rear visual guide projector which attaches to the second rear wheel 85R. Each of the visual guide projectors is adapted to project a visible line upon other objects, such as the horizontal surface 100. These visible lines allow the user to position and align the components of the target alignment system 10 in order to locate the optimum target position 72 upon the horizontal surface. Each visual guide projector incorporates a line laser, rotating laser, or other similar device which projects a beam capable of producing visible lines.

In order to accurately locate the optimum target position 72, the front wheels 84 of the vehicle 80 must be adjusted such that front wheels 84 and the rear wheels 85 are aligned and the thrust line 50 of the vehicle 80 matches the vehicle center line 92. This can be achieved in part by using a vehicle steering sensor 110 to ensure that the steering angle is set to zero degrees, as well as through other techniques which will be apparent to a person of ordinary skill in the art in the field of the invention. In addition to steering angle, there are other factors which affect the thrust line 50. For example, any variations in wheel alignment due to camber or front or rear toe angle should be corrected, and vehicle ride height and tire pressures should be adjusted to appropriate specifications to assist the calibration procedure. When the front wheels 84 are aligned with their corresponding rear wheels 85, the thrust line 50 of the vehicle 80 should correspond to the vehicle center line 92.

The visible lines projected by the first and second front visual guide projectors form longitudinal guide lines 52 which are oriented in parallel and extend in a forward direction past the vehicle front 81F. In a preferred embodiment, the first front visual guide projector 30A projects a first longitudinal guide line 52L while the second front visual guide projector 30B projects a second longitudinal guide line 52R.

The target assemblies 40 comprise a first target assembly 40L and a second target assembly 40R. The first and second target assemblies 40L, 40R are positioned upon the horizontal surface 100 ahead of the vehicle front 81F, and are aligned with the first and second longitudinal guide lines 52L, 52R respectively. The lateral alignment guide visual projector 34 is adapted to project a lateral alignment guide line 58 which is perpendicular to the first and second longitudinal guide lines 52L, 52R and extends between the first and second target assemblies 40L, 40R. The center visual guide projector 32 is placed at a position between the first and second target assemblies 40L, 40R, and projects a center guide line 70 upon the horizontal surface 100 that is colinear with the vehicle center line 92. The transverse visual guide projector 38 is placed forward of the vehicle front 81F, and is adapted to project a transverse guide line 56 upon the horizontal surface 100 which perpendicularly intersects the center guide line 70. The placement of the transverse guide line 56 is determined by the calibration distance 51, and the resulting intersection between the transverse line 56 and the center guide line 70 corresponds to the optimum target position 72. The calibration target 109 is placed upon the optimum target position 72, thus allowing the sensor 94 to be accurately calibrated.

Figure 3:
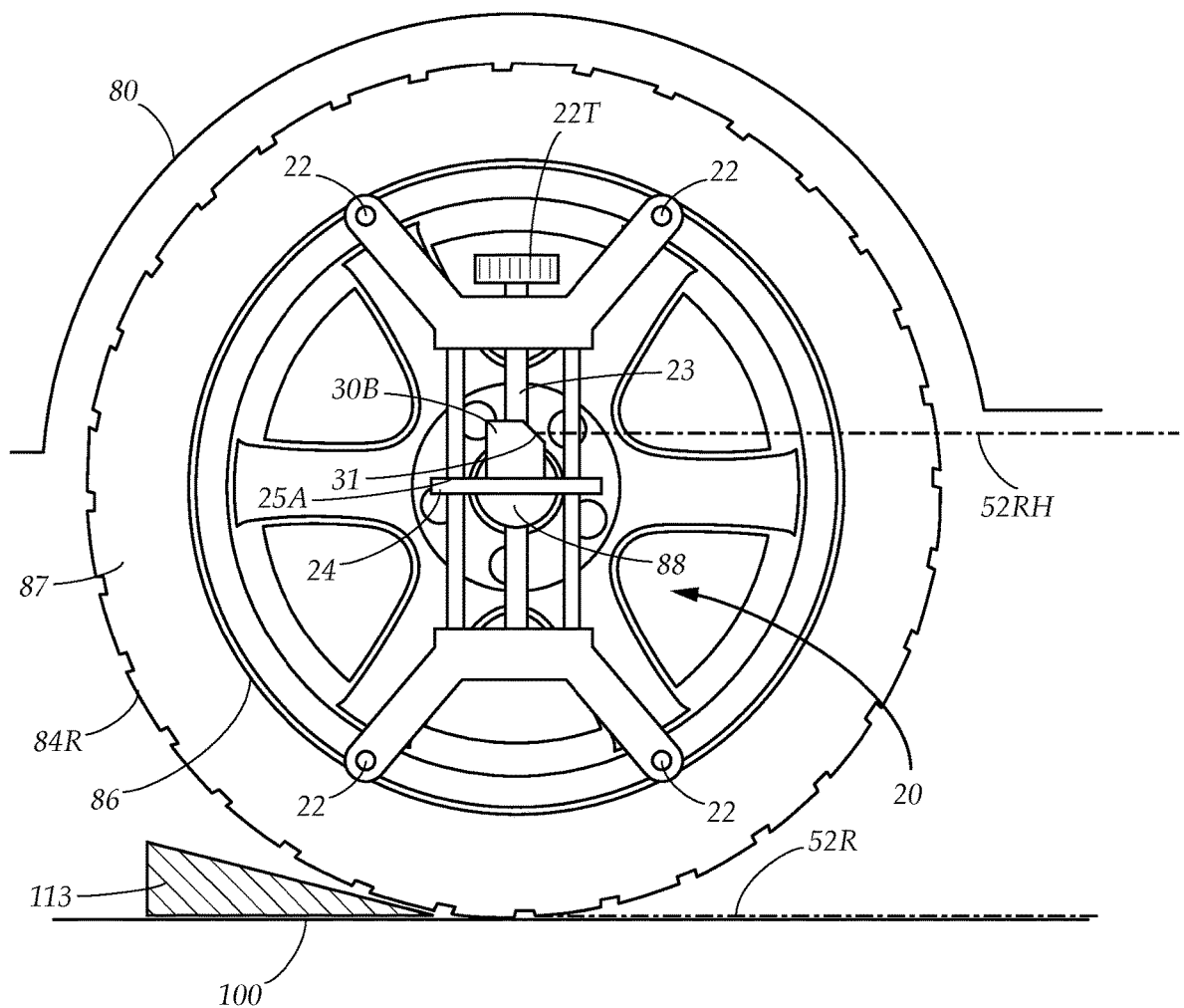
FIG. 3 is a diagrammatical side view of a wheel attachment assembly which is removably attached to one of the vehicle's wheels and mounts a visual guide projector, in accordance with an embodiment in the present disclosure.

Turning now to FIG. 3 while also referring to FIGS. 1A-B, each wheel has a circular wheel rim 86, a tire 87 which surrounds the wheel rim 86, and a wheel center 88. Each wheel-mounted visual guide projector 30 is detachably secured to one of the wheels via a wheel attachment assembly 20. The wheel attachment assembly 20 further ensures that the wheel-mounted visual guide 30 is aligned with the wheel center 88. In one embodiment, each wheel attachment assembly 20 has a central connecting member 23 and a plurality of rim grips 22 attached to the central connecting member 23. The rim grips 22 are adapted to grip the wheel at a plurality of points along the circumference of the wheel rim 86, between the wheel rim 86 and the tire 87. Each wheel attachment assembly 20 also has a visual guide attachment point 24 which is connected to the central connecting member 23 and is adapted to support one of the wheel-mounted visual guide projectors 30 such that the wheel-mounted visual guide projector 30 is aligned with the wheel center 88. In one embodiment, the visual guide attachment point 24 has a pivot plate 25A upon which the wheel-mounted visual guide projector 30 rests. The pivot plate 25A is capable of rotating to ensure that the pivot plate 25A and the wheel-mounted visual guide projector 30 are level with the horizontal surface 100.

Figure 4:
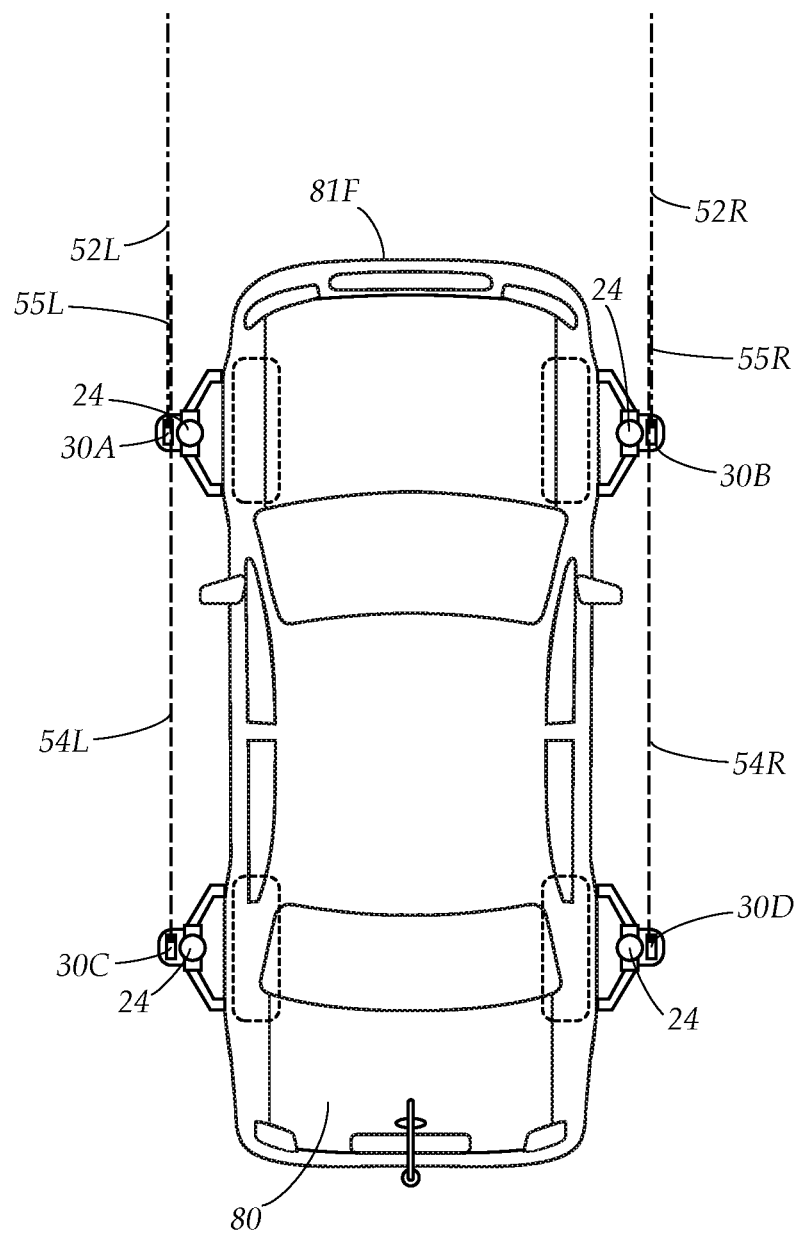
FIG. 4 is a diagrammatical top view of the vehicle positioned on a horizontal surface, depicting longitudinal guide lines projected upon the horizontal surface by the visual guide projectors attached to each of the wheels in accordance with an embodiment in the present disclosure.

Referring to FIG. 4 while also referring to FIGS. 1A-B and FIG. 3, once the first and second front visual guide projectors 30A, 30B have been attached to the first and second front wheels 84L, 84R, and the first and second rear visual guide projectors 30C, 30D have been attached to the first and second rear wheels 85L, 85R, the wheel-mounted visual guide projectors 30 are activated. The first and second rear visual guide projectors 30C, 30D each project a first rear longitudinal guide line 54L and a second rear longitudinal guide line 54R respectively. When the front and rear wheels 84, 85 are longitudinally aligned, the first longitudinal guide line 52L and first rear longitudinal guide line 54L will form a first convergence 55L, while the second longitudinal guide line 52R and second rear longitudinal guide line 54R will form a second convergence 55R, thus indicating that the front and rear wheels 84, 85 are longitudinally aligned. However, if the steering angle of the front wheels 84 do not match the steering angles of the corresponding rear wheels 85, the longitudinal guide lines 52 and the rear longitudinal guide lines 54 will not converge, thus indicating that further adjustment is required. In a preferred embodiment, the visible guide lines projected by the first and second rear visual guide projectors 30C, 30D are of a second color, while the visible guide lines projected by first and second front visual guide projectors 30A, 30B are of a first color, thus allowing the visible guide lines to be visually distinguishable by the user.

Figure 5:
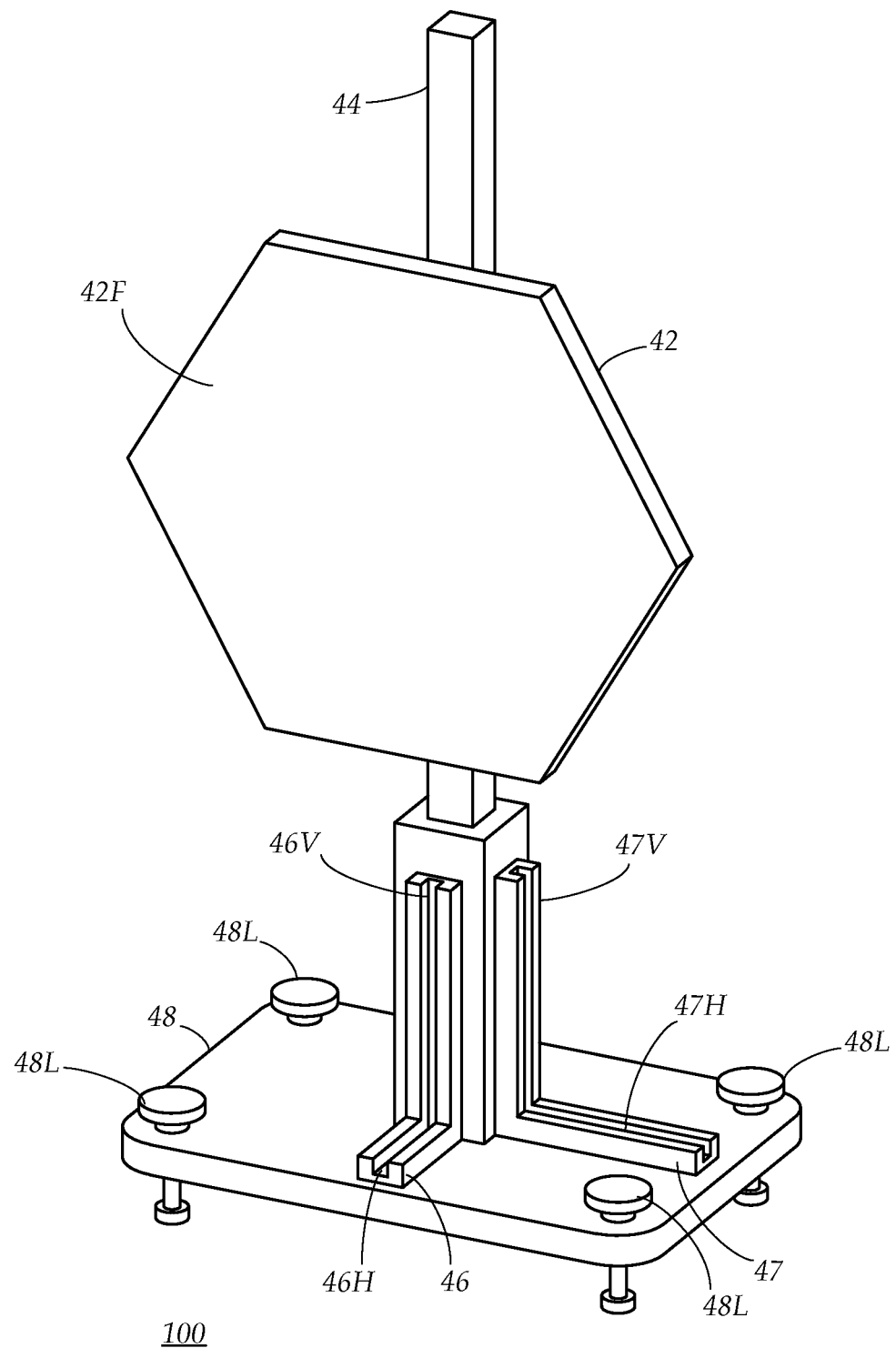
FIG. 5 is a diagrammatical perspective view of a first target assembly having a target plate, and longitudinal and lateral target alignment tracks, in accordance with an embodiment in the present disclosure.
Figure 6:
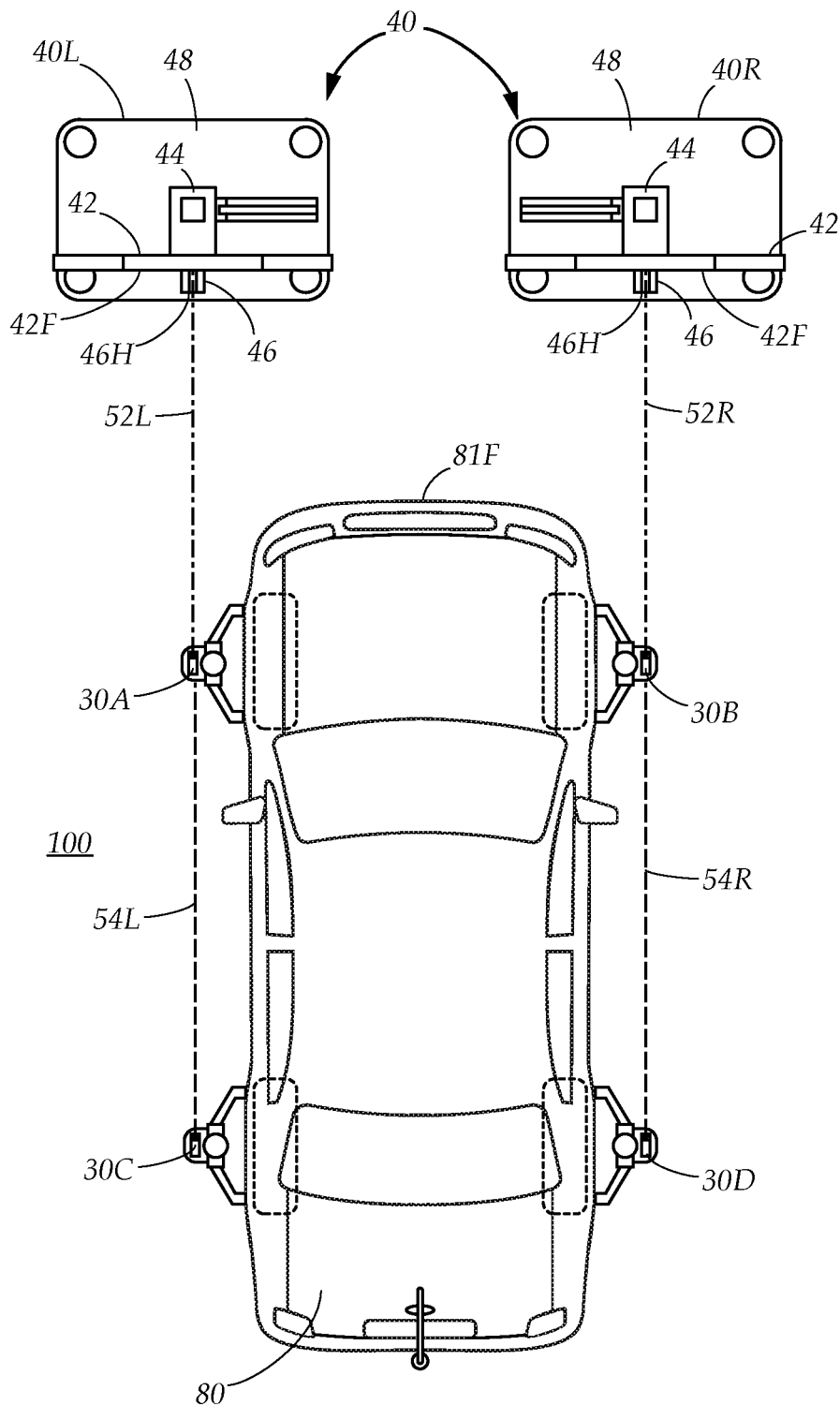
FIG. 6 is a diagrammatical top view of the first target assembly positioned alongside a second target assembly, showing the first and second target assemblies aligned with the first and second longitudinal guide lines, in accordance with an embodiment in the present disclosure.

Turning now to FIG. 5 and FIG. 6 while also referring to FIGS. 1A-B and FIG. 3, once the front and rear wheels 84, 85 are longitudinally aligned, the target assemblies 40 are positioned upon the horizontal surface 100 forward of the vehicle front 81F. Each target assembly 40 has a target plate 42 which is oriented perpendicularly in relation the horizontal surface 100. The target plate 42 is substantially planar in shape, and has a target face 42F which is oriented towards the vehicle front 81F. In one embodiment, each target assembly 40 has a base 48 which supports it upon the horizontal surface 100, and supporting portion 44 which extends upwardly from the base 48 and to which the target plate 42 is attached. The supporting portion 44 may also allow the target plate 42 to be alternately raised or lowered in relation to the base 48. In a preferred embodiment, the base 48 has an adjustable leveling mechanism, such as a plurality of legs 48L, which allow the base 48 to remain level and a parallel to the horizontal surface 100. Each target assembly 40 also has a longitudinal target alignment track 46 which allows the user to longitudinally align the target assembly 40 with one of the longitudinal guide lines 52 or rear longitudinal guide lines 54. The longitudinal target alignment track 46 forms a line, groove, ridge, or other similar mark or protrusion upon the target assembly 40 which allows the user to visually determine when one of the visible beams is colinear with the track, thus indicating alignment.

Figure 8:
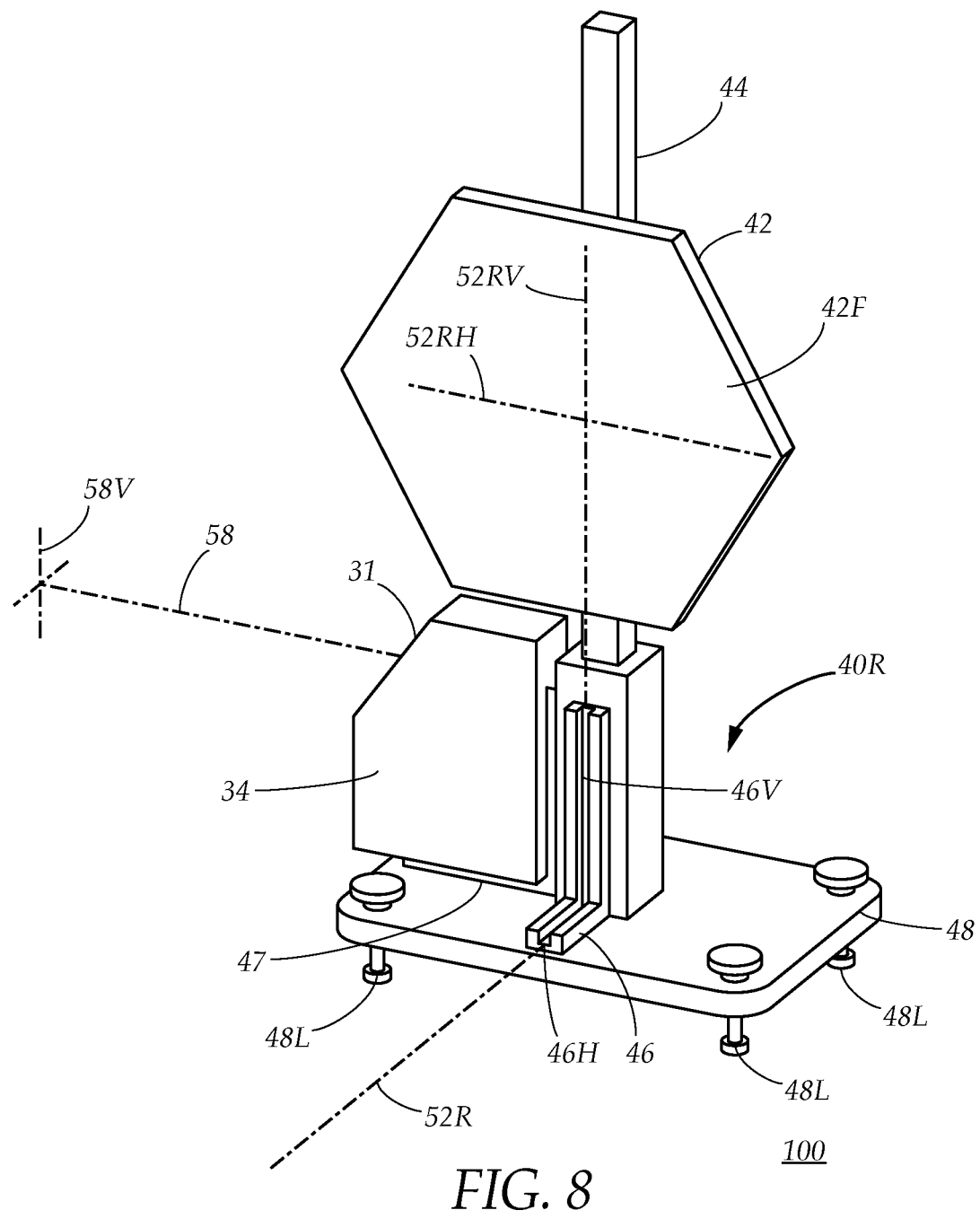
FIG. 8 is a diagrammatical perspective view of the second target assembly, showing a lateral alignment visual guide projector positioned perpendicularly to the second longitudinal guide line, in accordance with an embodiment in the present disclosure.

Referring to FIG. 8 while also referring to FIGS. 1A-B and FIGS. 5-6, the longitudinal target alignment track 46 of each target assembly 40 may have a horizontal component 46H, as well as a vertical component 46V. The horizontal component 46H extends horizontally and perpendicularly away from the target face 42F, while the vertical component 46V extends upwardly and perpendicularly away from the horizontal surface 100. In one embodiment, the horizontal component 46H extends along the base 48, while the vertical component 46V extends upwardly along the supporting portion 44.

For each target assembly 40 to be correctly positioned upon the horizontal surface 100, the longitudinal alignment tracks 46 of the first and second target assemblies 40L, 40R must be aligned with the first and second longitudinal guide lines 52L, 52R respectively. The user may adjust the target assembly 40 upon the horizontal surface 100 until the longitudinal alignment track 46 is visibly colinear with the first or second longitudinal guide line 52L, 52R as appropriate.

Figure 7A:
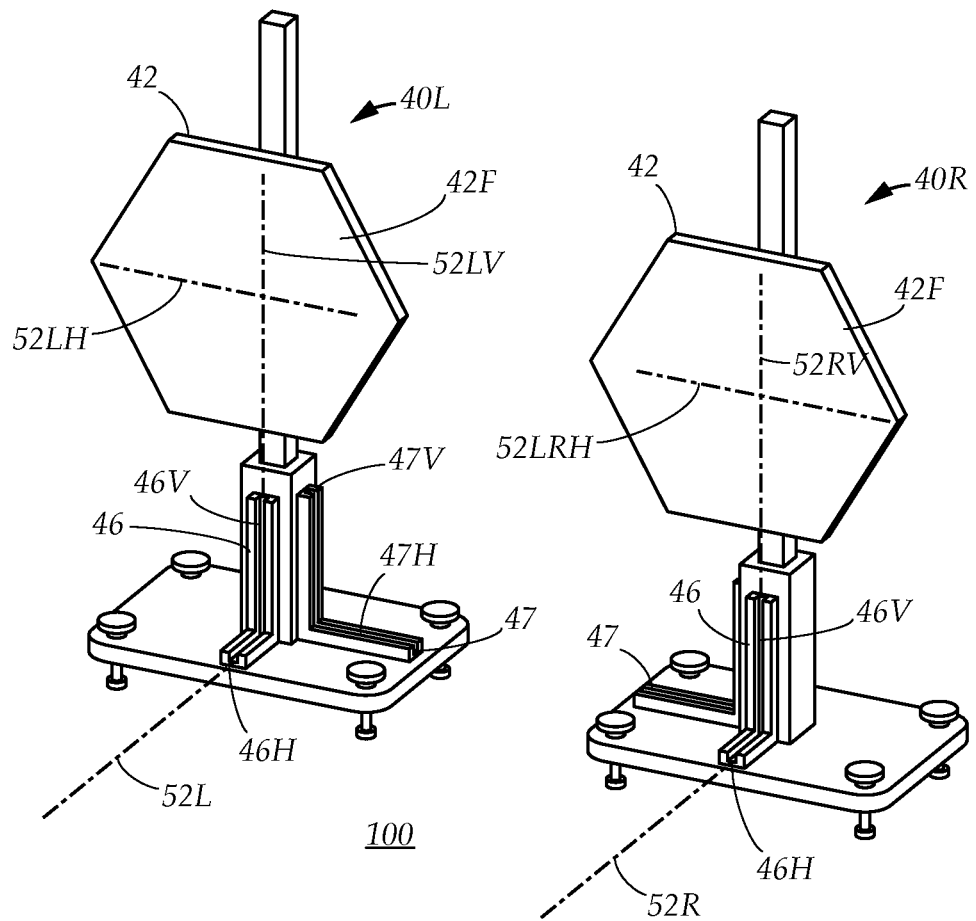
FIG. 7A is a diagrammatical perspective view of the first and second target assemblies, showing the longitudinal target alignment tracks of the first and second target assemblies aligned with the first longitudinal guide line and the second longitudinal guide line respectively, further showing the first and second longitudinal guide lines reflected on the target plates of the target assemblies, in accordance with an embodiment in the present disclosure.
Figure 7B:
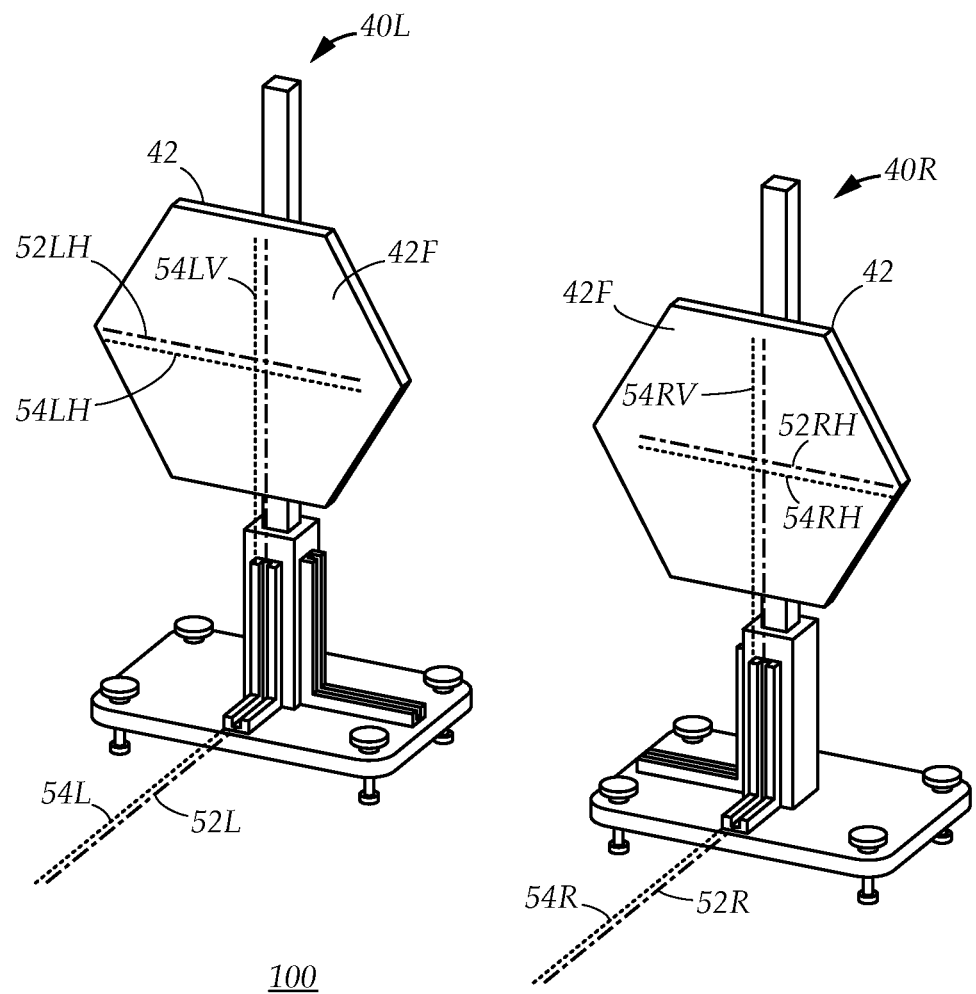
FIG. 7B is a diagrammatical perspective view of the first and second target assemblies, showing mis-aligned horizontal level guide lines reflected on the target plates, in accordance with an embodiment in the present disclosure.

Returning to FIG. 1A while also referring to FIGS. 7A-7B, in a preferred embodiment, the first and second longitudinal guide lines 52L, 52R and the first and second rear longitudinal guide lines 54L, 54R are produced using a moving laser, such as a rotating laser, line laser, or other similar device within each of the wheel-mounted visual guide projectors 30. The moving laser produces a beam that moves along a simulated vertical plane. Where the vertical plane intersects with the horizontal surface 100, a visible guide line is produced which corresponds to one of the longitudinal guide lines 52 or rear longitudinal guide lines 54. Similarly, where the vertical plane intersects with a vertical portion of one of the target assemblies 40 or other vertically oriented object, such as the vertical component 46V of the longitudinal track 46 or the target face 42F, a vertical guide line is produced. The first front visual guide projector 30A and second front visual guide projector 30B each project a first vertical guide line 52LV and a second vertical guide line 52RV respectively, while the first rear visual guide projector 30C and second rear visual guide projector 30D each project a first rear vertical guide line 54LV and a second rear vertical guide line 54RV respectively.

Referring to FIG. 1A, FIG. 4, FIG. 6, and FIGS. 7A-B, the use of the horizontal and vertical components 46H, 46V of the longitudinal target alignment track 46 increases the precision of alignment between the longitudinal guide lines 52 and the target assemblies 40. The first longitudinal guide line 52L and the first rear longitudinal guide line 54L first align upon the horizontal surface 100 and form the first convergence 55L. The colinear first longitudinal guide line 52L and the first rear longitudinal guide line 54L continue to extend forwardly to the first target assembly 40L to align with the horizontal component 46H of the longitudinal target alignment track 46, while the first vertical guide line 52LV and first rear vertical guide line 54LV vertically align with the vertical component 46V. As the horizontal component 46H is perpendicular to the target face 42F, correct longitudinal alignment ensures that the target face 42F is perpendicular to the first longitudinal guide line 52L and the first rear longitudinal guide line 54L. The vertical alignment of the first vertical guide line 52LV and the first rear vertical guide line 54LV with the vertical component 46V further ensures that the first target assembly 40L is correctly leveled upon the horizontal surface 100 and that the supporting portion 44 points directly upward.

Similarly, the principles disclosed above regarding the longitudinal and vertical alignment of the first target assembly 40L can be applied to the precision alignment of the second target assembly 40R by aligning the second longitudinal guide line 52R and the second rear longitudinal guide line 54R with the horizontal component 46H of the longitudinal target alignment track 46, and aligning the second vertical guide line 52RV and the second rear vertical guide line 54RV with the vertical component 46V.

Furthermore, in a preferred embodiment, each of the wheel-mounted visual guide projectors 30 is also adapted to project a moving laser that moves within a simulated horizontal plane via a rotating laser, cross-line laser, or similar means. When the simulated horizontal plane intersects with an object, such as one of the target faces 42F, a visible horizontal guide line is produced. The first front visual guide line projector 30A projects a first horizontal guide line 52LH, the second front visual guide line projector 30B projects a second horizontal guide line 52RH, the first rear visual guide line projector 30C projects a first rear horizontal guide line 54LH, while the second rear visual guide line projector 30D projects a second rear horizontal guide line 54RH.

Referring to FIGS. 1A-B, FIG. 3, FIG. 7B, and FIG. 9, the first horizontal guide line 52LH and the first rear horizontal guide line 54LH are visible upon the target face 42F of the first target assembly 40L, while the second horizontal guide line 52RH and the second rear horizontal guide line 54RH are visible upon the target face 42F of the second target assembly 40R. In a preferred embodiment, the simulated horizontal planes projected by each of the wheel-mounted visual guide projectors 30 each pass through the wheel center 88 of their respective wheels. For example, the second front visual guide projector 30B can be adjusted using the wheel attachment assembly 20 until the second horizontal guide line 52RH passes through the wheel center 88 of the second front wheel 84R. The target faces 42F of the first and second target assemblies 40L, 40R are utilized to determine whether the front and rear wheels 84, 85 are level upon the horizontal surface 100.

Where the horizontal surface 100 is free of irregularities, the first horizontal guide line 52LH and the first rear horizontal guide line 54LH will be horizontally aligned upon the target face 42F of the first target assembly 40L, while the second horizontal guide line 52RH and the second rear horizontal guide line 54RH will be horizontally aligned upon the target face 42F of the second target assembly 40R. If one of the horizontal guide lines appears to be lower upon its associated target face 42F than the other horizontal guide line due to an irregularity present upon the horizontal surface 100, the user may raise the associated front or rear wheel to restore horizontal guide lines to horizontal alignment. For example, if the second rear wheel 85R is lower than the second front wheel 84R due to a depression in the horizontal surface 100 below the second rear wheel 85R, the user may raise the second rear wheel 85R by inserting a shim plate 113, wedge, or other device between the second rear wheel 85R and the horizontal surface 100 to restore the horizontal alignment between the second rear horizontal guide line 54RH and the second horizontal guide line 52RH upon the target face 42F of the second target assembly 40R.

In a preferred embodiment, each of the wheel-mounted visual guide projectors 30 has a self-leveling mechanism which ensures that the simulated horizontal plane is level, and that the simulated vertical plane is perpendicular to the simulated horizontal plane.

Figure 9:
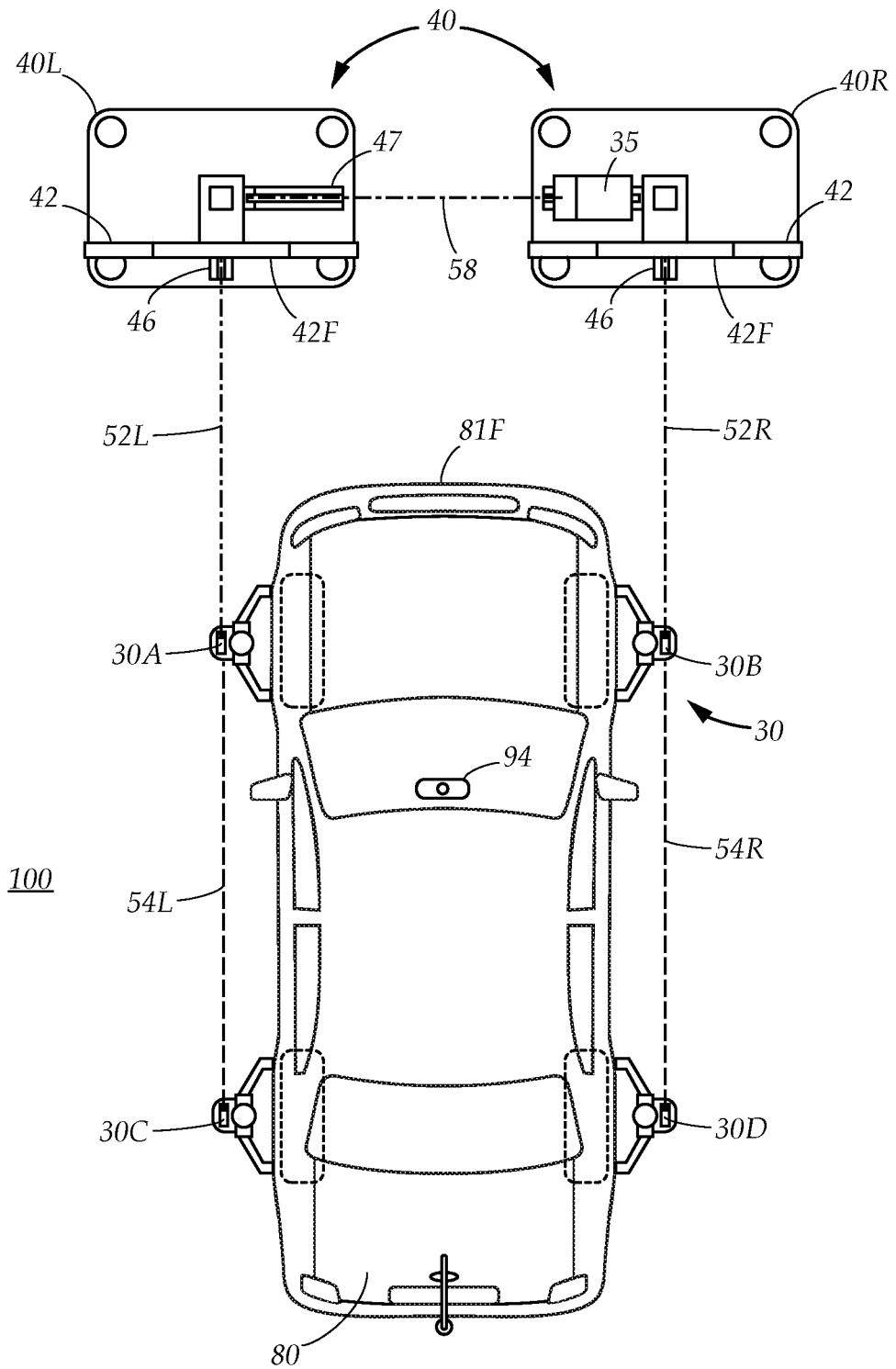
FIG. 9 is a diagrammatical top view of the target alignment system, showing the alignment visual guide projector emitting an alignment guide line towards the first target assembly for ensuring that the first and second target assemblies are equidistant in relation to the vehicle, in accordance with an embodiment in the present disclosure.

Turning to FIG. 9 while also referring to FIG. 5 and FIG. 8, to enable accurate calibration of the sensor 94, the first and second target assemblies 40L, 40R must be laterally aligned upon the horizontal surface 100 to ensure that the target faces 42F of both target assemblies 40 are equidistant in relation to the sensor 94. In a preferred embodiment, the lateral alignment visual guide projector 34 is adapted to project a lateral alignment guide line 58 upon the horizontal surface 100 which extends between the first and second target assemblies 40L, 40R. Each target assembly 40 may have a lateral alignment track 47, which is oriented perpendicularly to the longitudinal target alignment track 46. When the target assemblies 40 are placed upon the horizontal surface 100, the lateral alignment track 47 of the first and second target assemblies 40L, 40R are inwardly oriented such that each lateral alignment track 47 faces towards the opposite target assembly 40. The lateral alignment visual guide projector 34 may be placed upon either the first or the second target assembly 40L, 40R, with the projecting end 31 directed towards the opposite target assembly 40. The lateral alignment guide line 58 aligns with the lateral target alignment track 47 of the target assembly 40 from which the lateral alignment guide line 58 is projected, and the lateral alignment guide line 58 extends towards the lateral target alignment track 47 of the opposite target assembly 40. Where necessary, one or both of the target assemblies 40 are adjusted upon the horizontal surface 100 until the lateral target alignment track 47 of the opposite target assembly 40 and the lateral alignment guide line 58 are aligned.

In a preferred embodiment, the lateral alignment visual guide projector 34 is placed upon the base 48 of one of the target assemblies 40, with the projecting end 31 of the lateral alignment visual guide projector 34 oriented towards the other target assembly 40. In the examples shown in FIGS. 5, 8, and 9, the lateral alignment visual guide projector 34 may be placed upon the base 48 of the second target assembly 40R in alignment with the lateral target alignment track 47 thereof, and the lateral alignment guide line 58 is projected across the horizontal surface 100 to intersect with the first target assembly 40L and align with its lateral target alignment track 47. Note however, that the lateral alignment visual guide projector 34 may alternatively be positioned upon the first target assembly 40L, so that the lateral alignment guide line 58 intersects with the second target assembly 40R to align with its lateral target alignment track 47.

In a preferred embodiment, the lateral target alignment track 47 has a horizontal component 47H and a vertical component 47V, in a manner similar to the longitudinal target alignment track 46. In a preferred embodiment, the vertical component 47V of the lateral target alignment track 47 is positioned upon the supporting portion 44 of the target assembly 40, while the horizontal component 47H is positioned upon the base 48 and extends perpendicularly away from the vertical component 47V.

The lateral alignment visual guide projector 34 may also be adapted to project a simulated vertical plane by means of a rotating laser or other similar device. In addition to producing a lateral alignment guide line 58 upon the horizontal surface 100, the horizontal component 47H of the lateral target alignment track 47, or any other horizontally disposed object or surface, the simulated vertical plane also produces a lateral alignment guide line vertical portion 58V upon intersecting with a vertically disposed object such as the vertical component 47V of the lateral target alignment track 47. By aligning the lateral alignment guide line vertical portion 58V with the lateral target alignment guide's 47 vertical portion 46V, the user can ensure that the vertical portions 46V of both target assemblies 40 are in vertical alignment. In a preferred embodiment, the alignment of the lateral alignment guide line vertical portion 58V with the vertical portion 46V of the lateral target alignment track 47 ensures that the base 48 of the target assembly 40 is level with the horizontal surface 100 and that the supporting portion 44 points directly upward. This can be used in conjunction with the vertical alignment of the first and second longitudinal guide lines 52L, 52R with the vertical portions 46V of the longitudinal target alignment tracks 46 to ensure greater precision.

Figure 10:
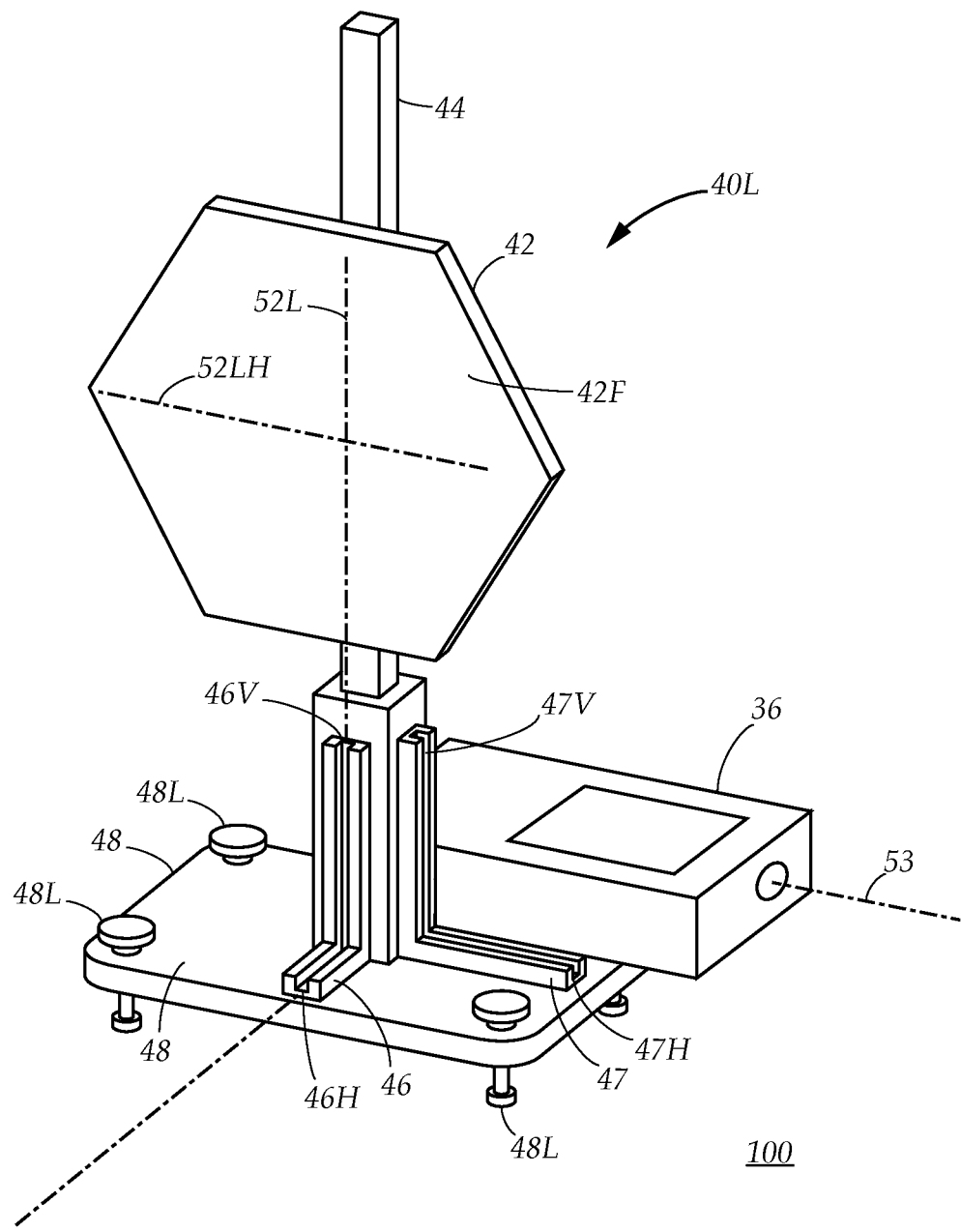
FIG. 10 is a diagrammatical perspective view of the first target assembly, showing a distance measuring projector positioned upon the first target assembly which projects a distance measuring line perpendicularly to the first longitudinal guide line, in accordance with an embodiment in the present disclosure.
Figure 11:
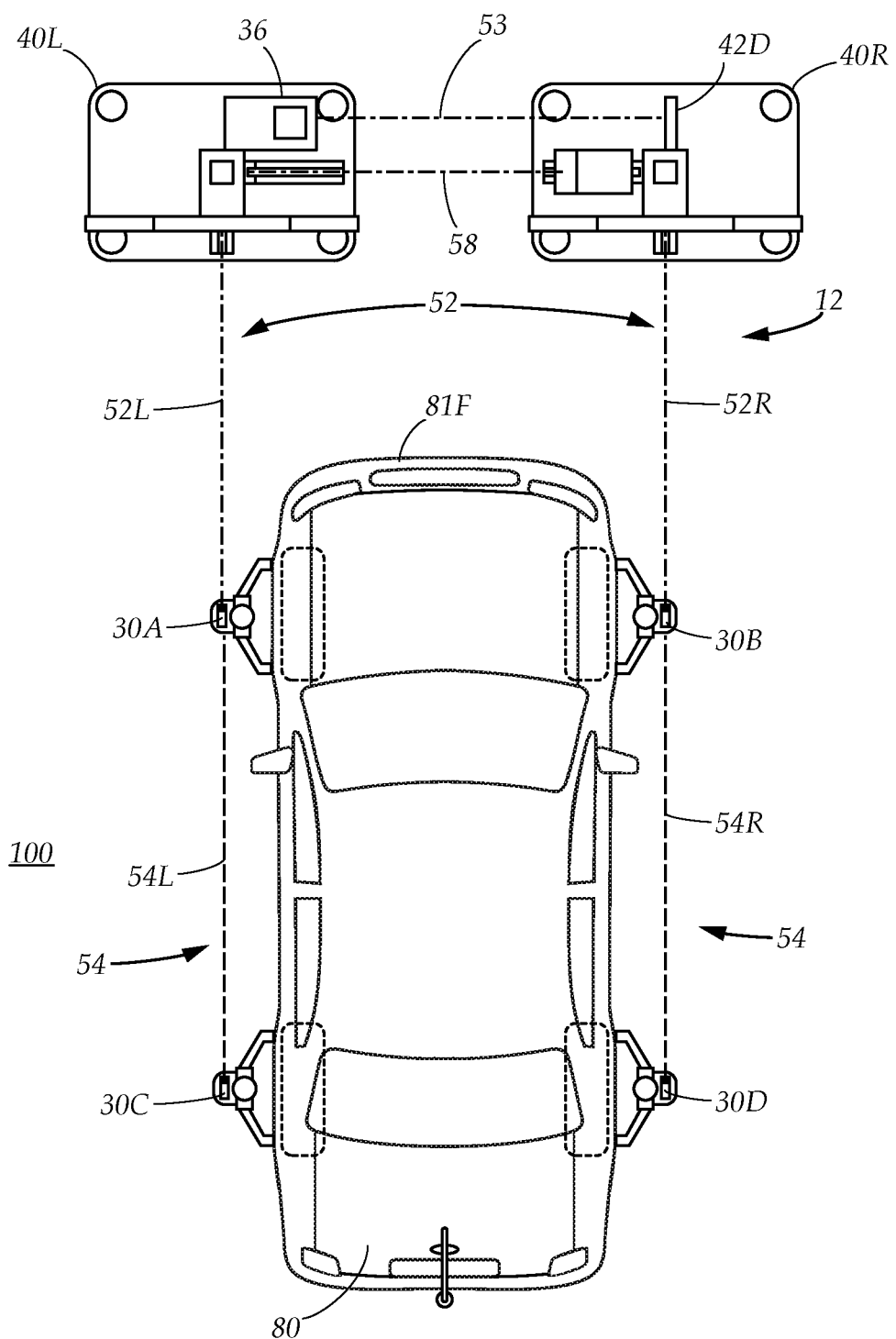
FIG. 11 is a diagrammatical top view of the target alignment system, showing the distance between the first and second longitudinal guide lines being determined using a distance measuring projector, in accordance with an embodiment in the present disclosure.
Figure 12:
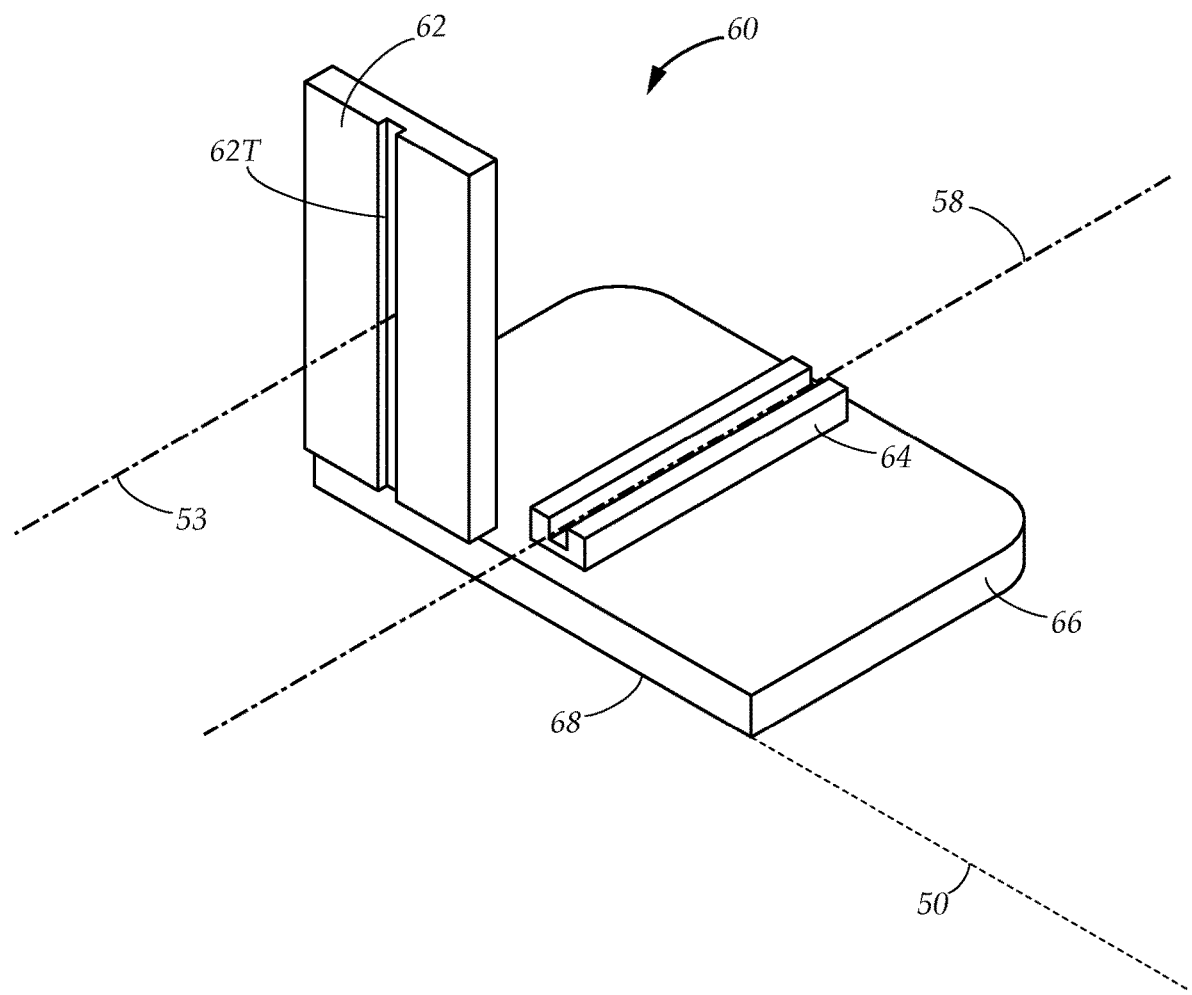
FIG. 12 is a diagrammatical perspective view of a thrust line target with a thrust line distance target, a thrust target lateral alignment track, and a center guide line alignment mark, in accordance with an embodiment in the present disclosure.

Referring to FIG. 10, FIG. 11, and FIG. 12 while also referring to FIG. 1A, once the first and second target assemblies 40L, 40R are laterally aligned with each other and longitudinally aligned with the first and second longitudinal guide lines 52L, 52R, a visible guide line perimeter 12 is formed. The visible guide line perimeter 12 extends from the first rear visual guide line projector 30C to the first target assembly 40L via the first longitudinal guide line 52L and the first rear longitudinal guide line 54L, then from the first target assembly 40L to the second target assembly 40R via the lateral alignment guide line 58, and finally from the second target assembly 40R to the second rear visual guide projector 30D via the second longitudinal guide line 52R and the second rear longitudinal guide line 54R. The visible guide line perimeter 12 is precisely aligned and allows for the center guide line 70 and the transfer guide line 56 to be placed in order to locate the optimum target position 72.

In order to place the center visual guide projector 32, a distance between the first and second longitudinal lines 52L, 52R must be measured. In a preferred embodiment, a distance measuring projector 36, such as a laser rangefinder, is placed on either the first or second target assemblies 40L, 40R. A corresponding distance target 42D is positioned upon the opposite target assembly 40. The distance measuring projector 36 projects a distance measuring line 53 to the distance target 42D to determine the distance between the first and second longitudinal guide lines 52L, 52R. In the example illustrated, the distance measuring projector 36 may be placed upon the base 48 of the first target assembly 40L, while the distance target 42D is positioned upon the second target assembly 40R, in alignment with the second longitudinal guide line 52R.

Figure 13:
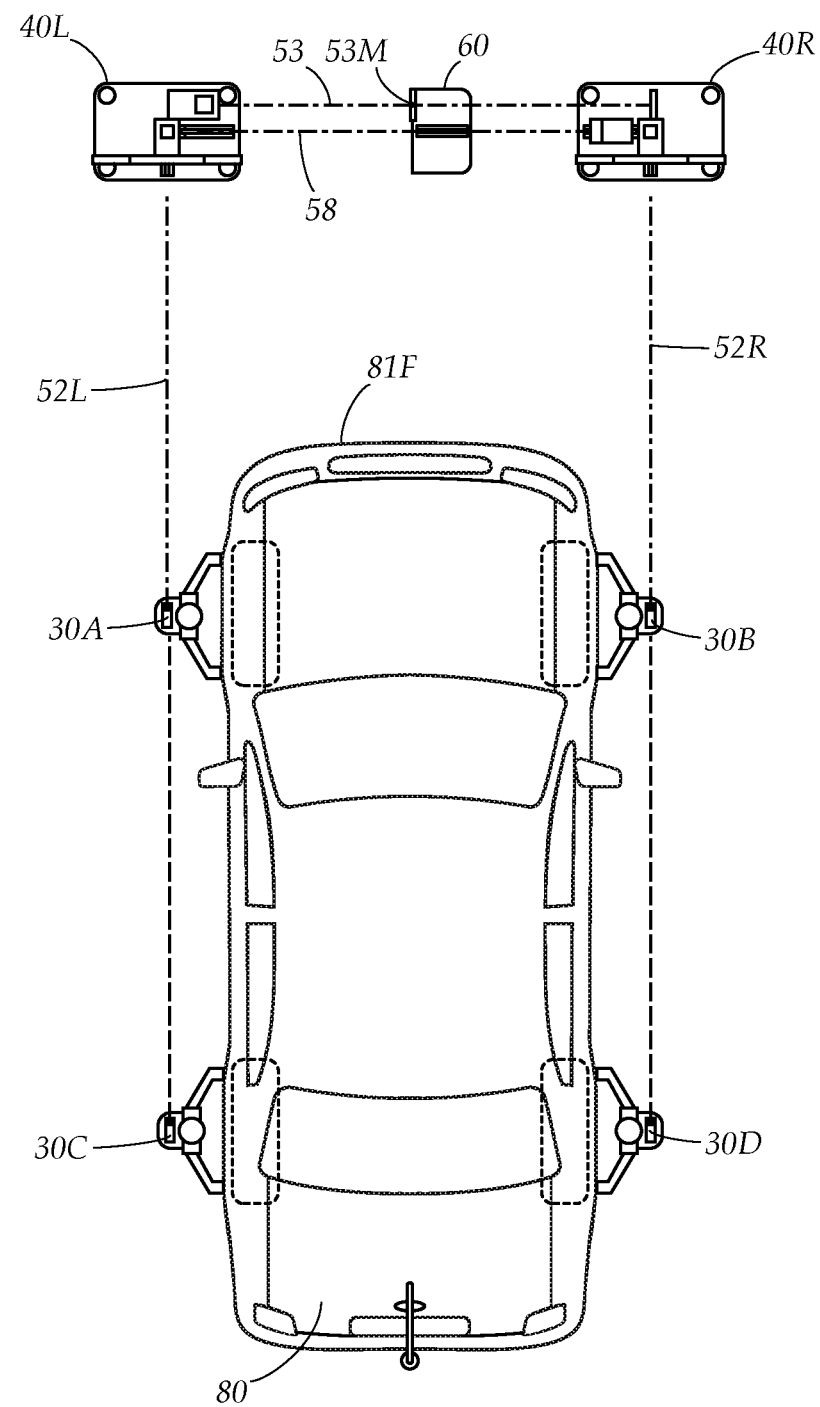
FIG. 13 is a diagrammatical top view of the target alignment system, showing the thrust line target placed upon the horizontal surface between the first and second target assemblies such that the thrust line distance target intersects the distance measuring line at a distance measuring line midpoint and the thrust line target lateral alignment track is aligned with the alignment guide line, in accordance with an embodiment in the present disclosure.

Referring to FIG. 12, FIG. 13, and FIG. 1A, a thrust line target 60 is used to identify a distance measuring line midpoint 53M which is equidistant between the first and second longitudinal guide lines 52L, 52R, by dividing the distance therebetween in half. In a preferred embodiment, the thrust line target 60 has a thrust line target lateral alignment track 64, and a center line alignment mark 68 oriented perpendicularly thereto. The thrust line target 60 also has a thrust line distance target 62 which is longitudinally aligned with the center line alignment mark 68. The thrust line target 60 is positioned upon the horizontal surface 100 such that the lateral alignment guide line 58 aligns with the thrust line target lateral alignment track 64, and the thrust line distance target 62 intersects the distance measuring line 53. In one embodiment, the thrust line target 60 has a thrust line target base 66 which rests upon the horizontal surface 100. The thrust line distance target 62 projects upwardly away from the thrust line target base 66.

The user adjusts the position of the thrust line target 60 until the thrust line distance target 62 intersects the distance measuring line 53 at the distance measuring line midpoint 53M. To ensure precise alignment of the thrust line target 60, the thrust line distance target 62 may have a distance target alignment track 62T. The user ensures that the distance measuring line 53 and the lateral alignment guide line 58 remain aligned with the distance target alignment track 62T and the lateral target alignment track 64 respectively.

Figure 14:
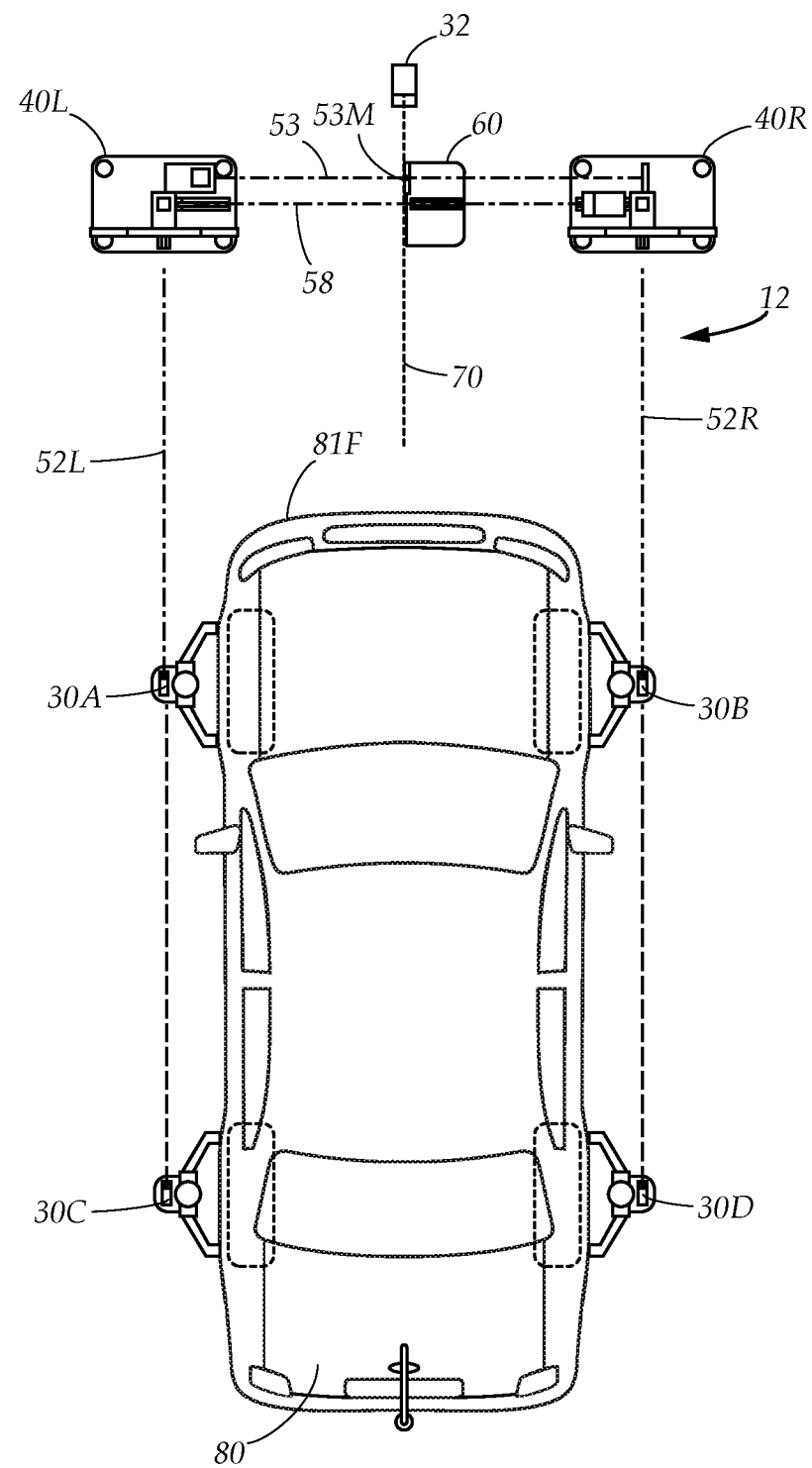
FIG. 14 is a diagrammatical top view of the target alignment system, showing a center visual guide projector which projects a center guide line in alignment with the center guide alignment mark of the thrust line target, in accordance with an embodiment in the present disclosure.
Figure 15:
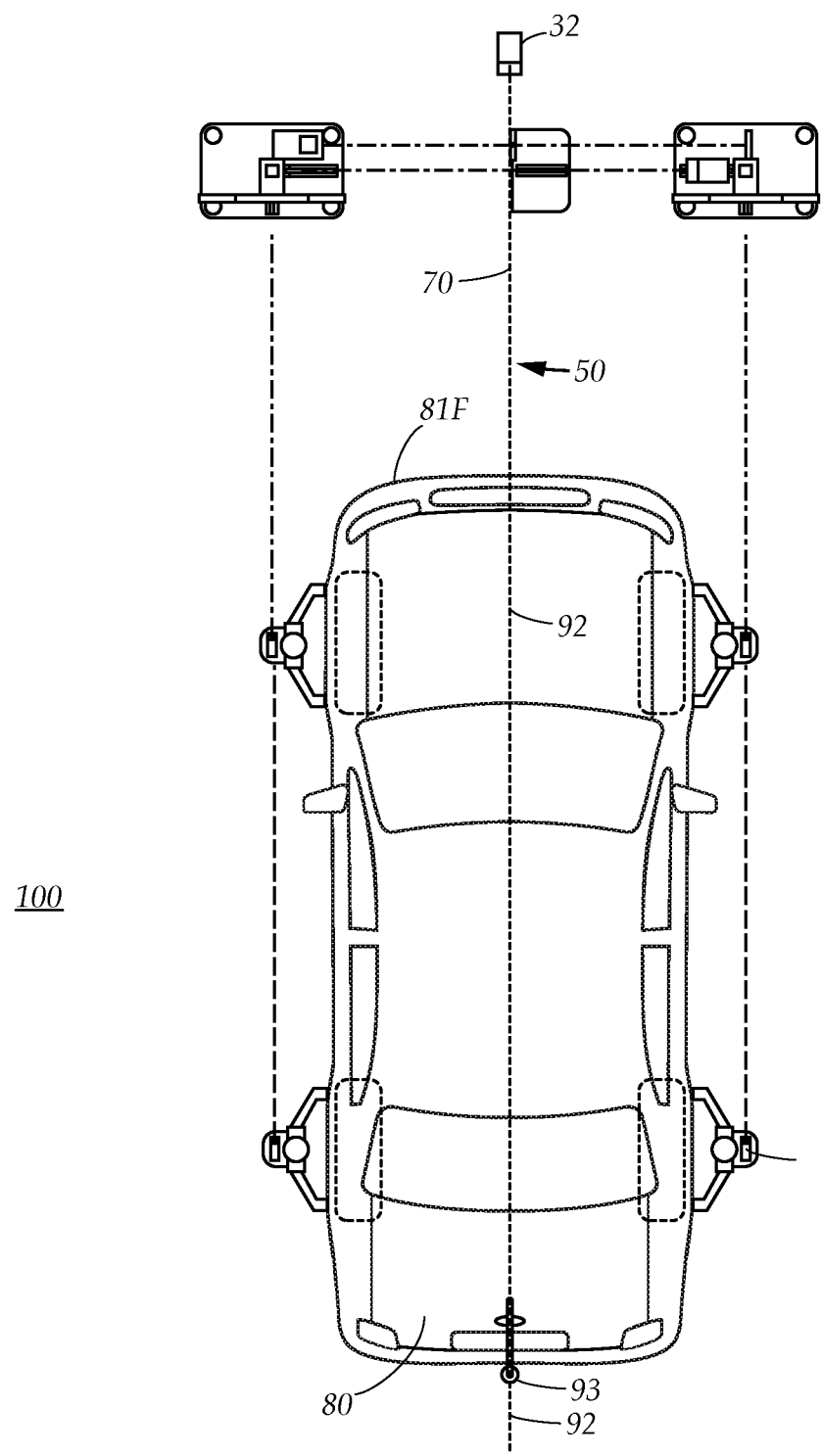
FIG. 15 is a diagrammatical top view of the target alignment system, showing the center guide line as being colinear with the center line of the vehicle as determined using the plumb bob, in accordance with an embodiment in the present disclosure.

Turning to FIGS. 14 and 15 while also referring to FIG. 1A and FIG. 12, once the distance measuring line midpoint 53M has been located, the center visual guide projector 32 is positioned such that it is aligned with the center guide line alignment mark 68. The center guide line projects the center guide line 70 perpendicularly to the lateral alignment guide line 58 and the distance measuring line 53. The center guide line 70 is colinear with both the thrust line 50 of the vehicle and the vehicle center line 92, and is visible upon the horizontal surface 100. In the example illustrated, the center visual guide projector 32 can be placed on or above the horizontal surface 100, such that the center guide line 70 aligns with the center guide line alignment mark 68, thus ensuring that the center guide line 70 is perpendicular to the lateral alignment guide line 58. Alternatively, the center visual guide projector 32 may be positioned upon the thrust line target 60 in alignment with the center visual guide alignment mark 68 or the thrust line distance target 62.

Figure 16:
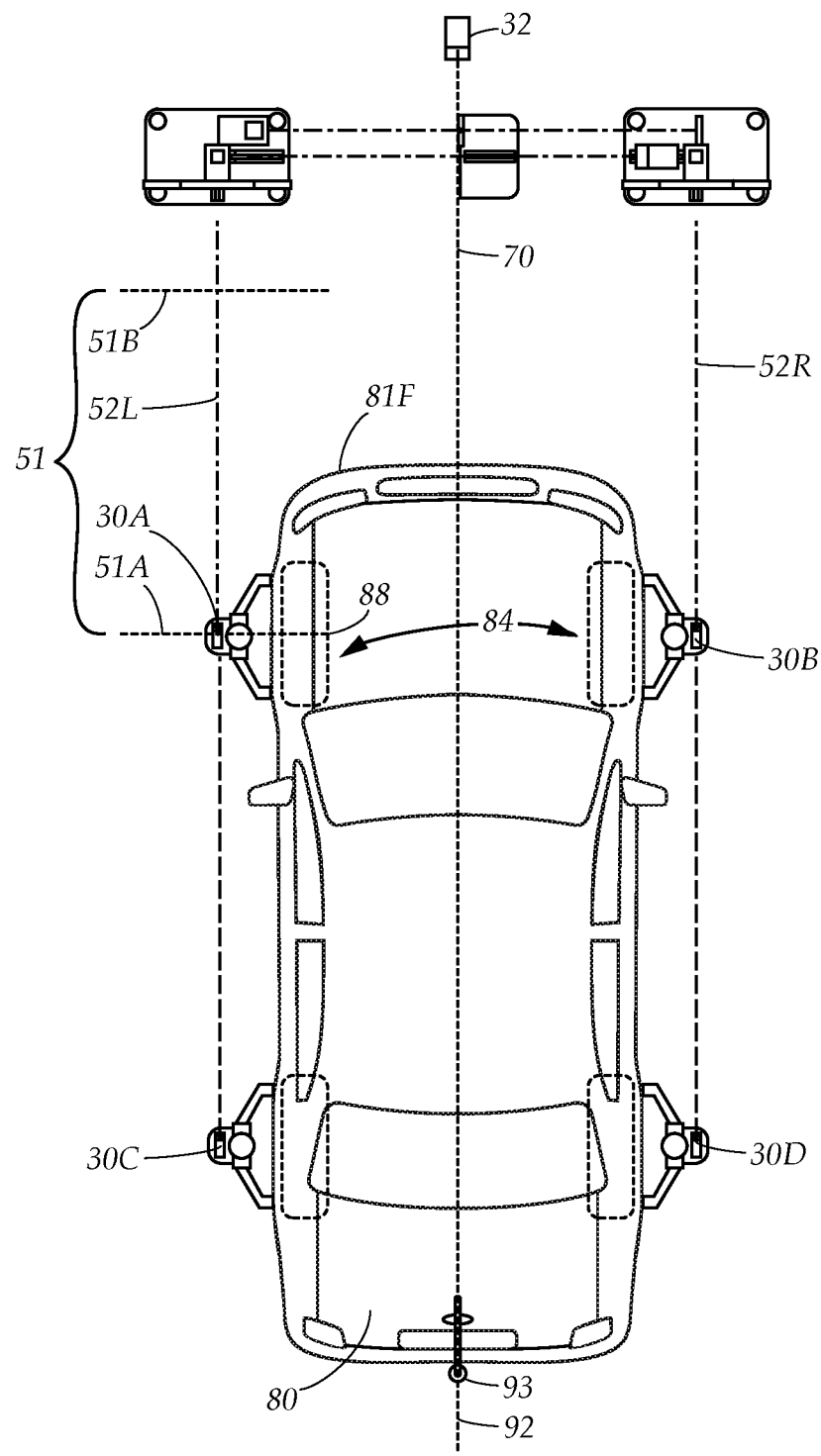
FIG. 16 is a diagrammatical top view of the target alignment system, showing a starting reference point and an ending reference point being measured along the first longitudinal guide line to mark the calibration distance, in accordance with an embodiment in the present disclosure.
Figure 17:
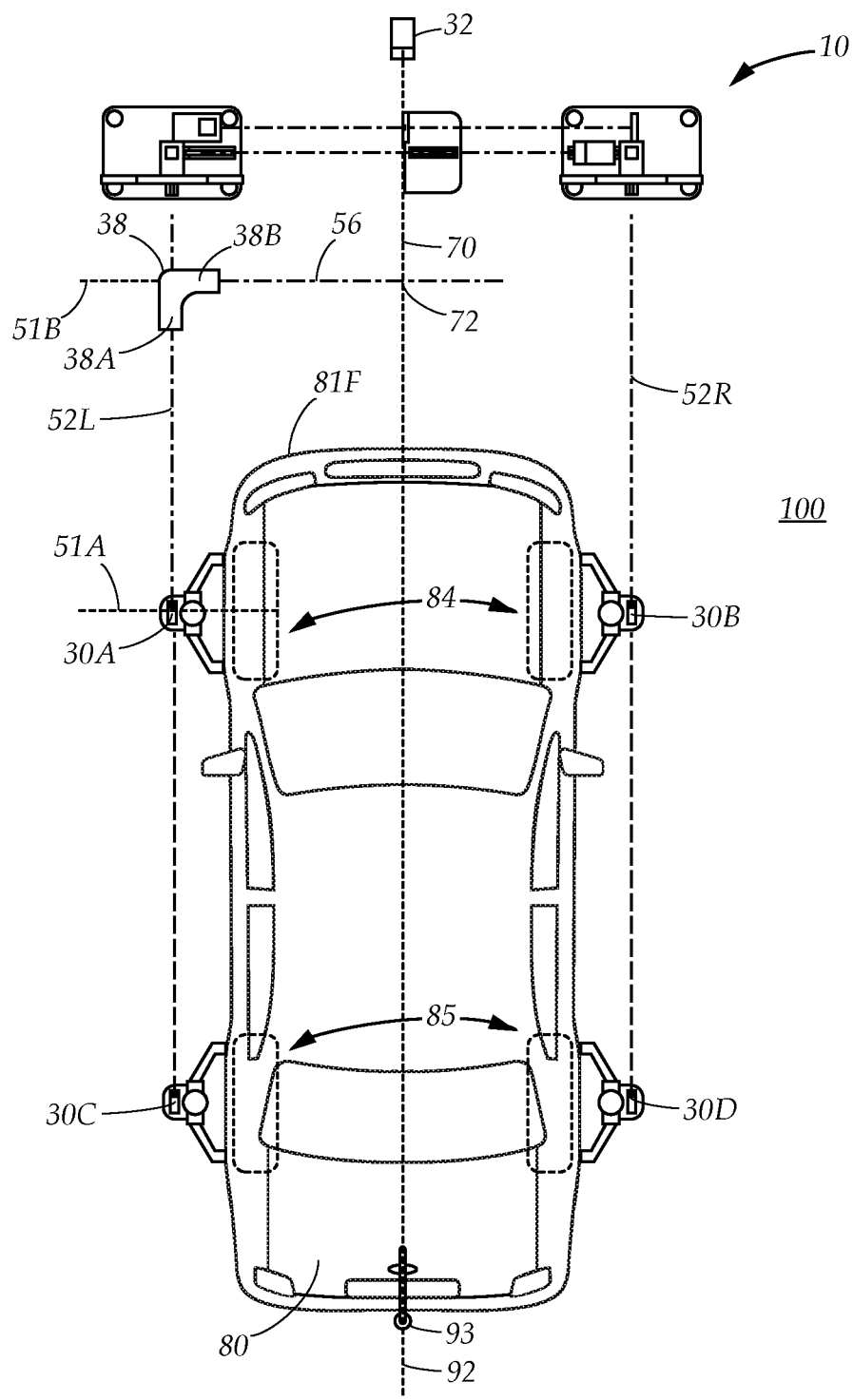
FIG. 17 is a diagrammatical top view of the target alignment system, showing a transverse visual guide projector positioned at the ending reference point, which projects a transverse line perpendicular to the first longitudinal guide line. The transverse line intersects the center guide line, and the intersection corresponds to the optimum target placement point, in accordance with an embodiment in the present disclosure.

Referring to FIG. 16 and FIG. 17 while also referring to FIG. 1A, once the center guide line 70 has been projected onto the horizontal surface 100, the calibration distance 51 for the sensor 94 is determined. In a preferred embodiment, a starting reference point 51A and an ending reference point 51B are located along either the first or second longitudinal guide lines 52L, 52R. In the example illustrated, the first longitudinal guide line 52L is used. The starting reference point 51A may be aligned with the vehicle front 81F, the wheel center 88 of one of the front wheels 84, or any other suitable point in accordance with the characteristics of the sensor 94. The ending reference point 51B is separated from the starting reference point 51A by the calibration distance 51.

The transverse visual guide projector 38 is positioned upon the horizontal surface 100 along the first or second longitudinal guide line 52L, 52R as appropriate. The transverse visual guide projector 38 is adapted to project the transverse guide line 56 across the horizontal surface 100 such that it perpendicularly intersects the center guide line 70 at an intersection point aligned laterally with the ending reference point 51B. The intersection point corresponds to the optimum target position 72.

In one embodiment, the transverse visual guide projector 38 is a device similar to a tile laser, and is adapted to project a transverse projector alignment line 56L perpendicularly to the transverse guide line 56. By aligning the transverse projector alignment line 56L with the first or second longitudinal guide line 52L, 52R, the transverse guide line 56 remains perpendicular to the center guide line 70 at the intersection point.

Figure 18:
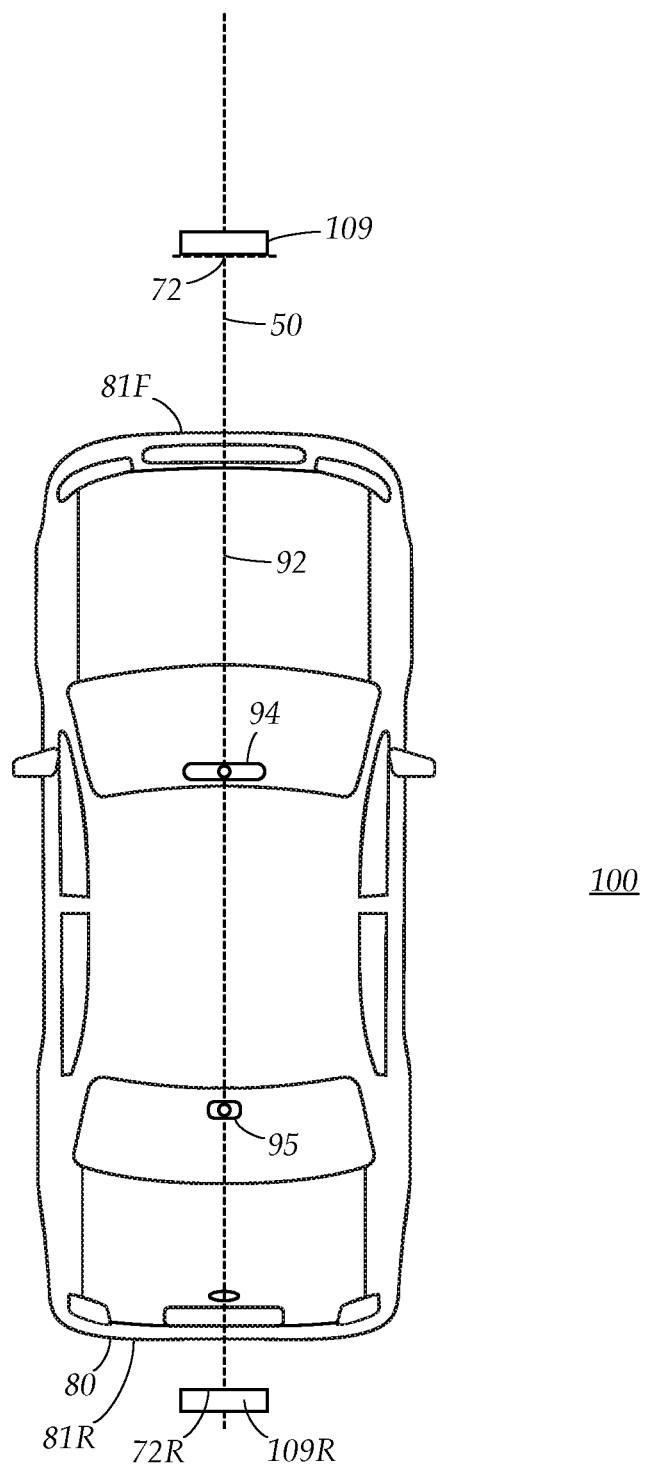
FIG. 18 is a diagrammatical top view of the calibration target positioned upon the optimum target placement point, in accordance with an embodiment in the present disclosure.
Figure 19:
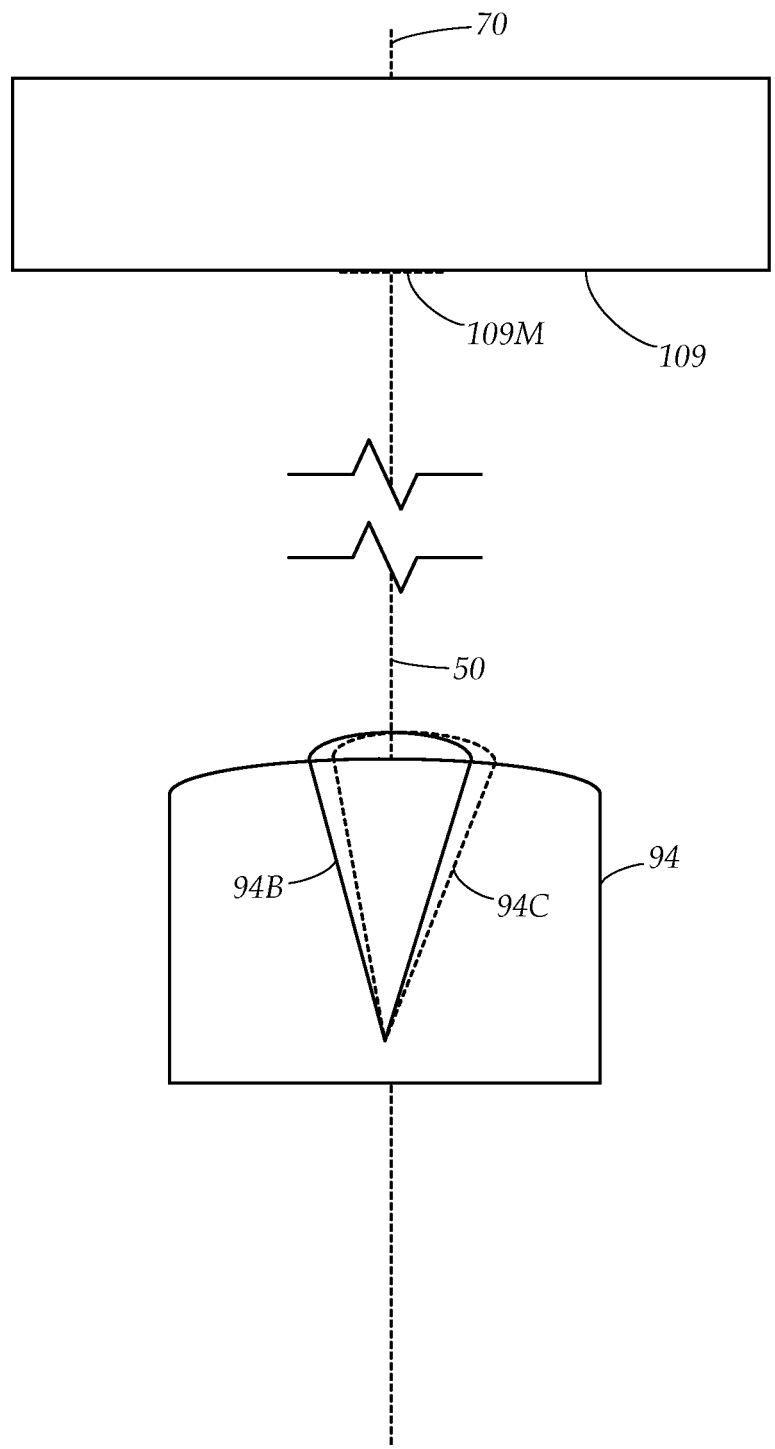
FIG. 19 is a block diagram depicting a calibration error resulting from an incorrectly positioned calibration target, in accordance with an embodiment in the present disclosure.

Referring to FIG. 18 and FIG. 19 while also referring to FIG. 17, the calibration target 109 is placed upon the horizontal surface 100 at the optimum target position 72 so that the vehicle center line 92 centrally intersects the calibration target 109. Proper usage of the target alignment system 10 ensures that the front and rear wheels 84, 85 are longitudinally aligned, with the result that the thrust line 50 of the vehicle matches the vehicle center line 92 and there is no dangerous mismatch between the actual thrust line 50 of the vehicle 80 and any perceived sensor data.

In one embodiment, the calibration target 109 has one or more calibration marks 109M which serve as reference markers which are tracked by one or more sensing components 94B of the sensor 94. Correct placement of the calibration target 109 ensures that the calibration marks 109M are accurately perceived by the sensing components 94B. An attempt to calibrate the sensor 94 in which the calibration marks 109M deviate even slightly from the correct alignment with the vehicle center line 92 results in an erroneous off-axis calibration 94C which is compounded by distances between the vehicle and potential obstacles. For example, a calibration error of one degree can result in a serious mismatch between the predicted path and the true path of the vehicle, whereby the ADAS of the vehicle 80 fails to predict a collision with a distant obstacle.

Figure 20A:
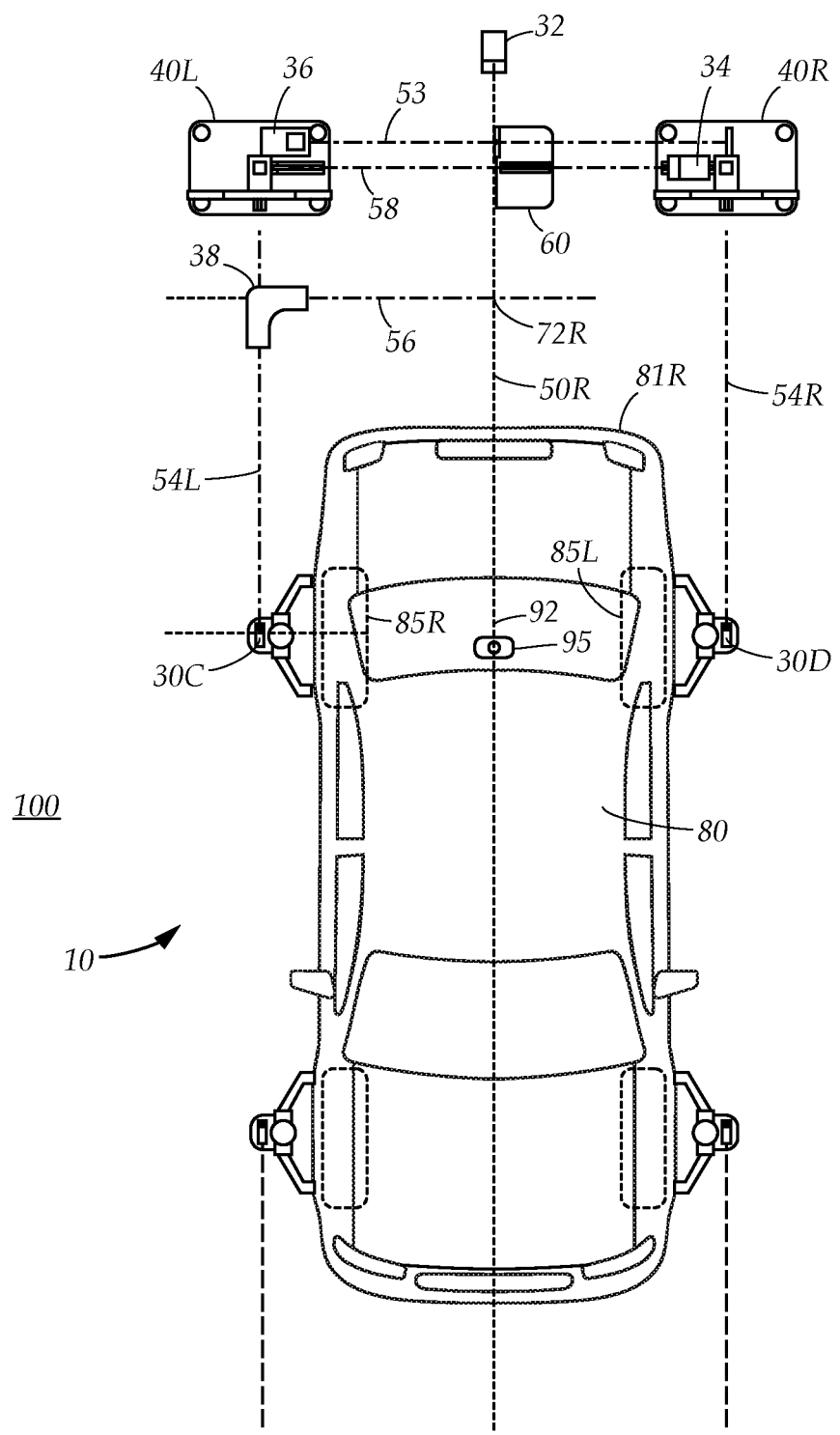
FIG. 20A is a diagrammatical top view of the target alignment system being used to locate a rear optimum target position behind the vehicle, in accordance with an embodiment in the present disclosure.
Figure 20B:
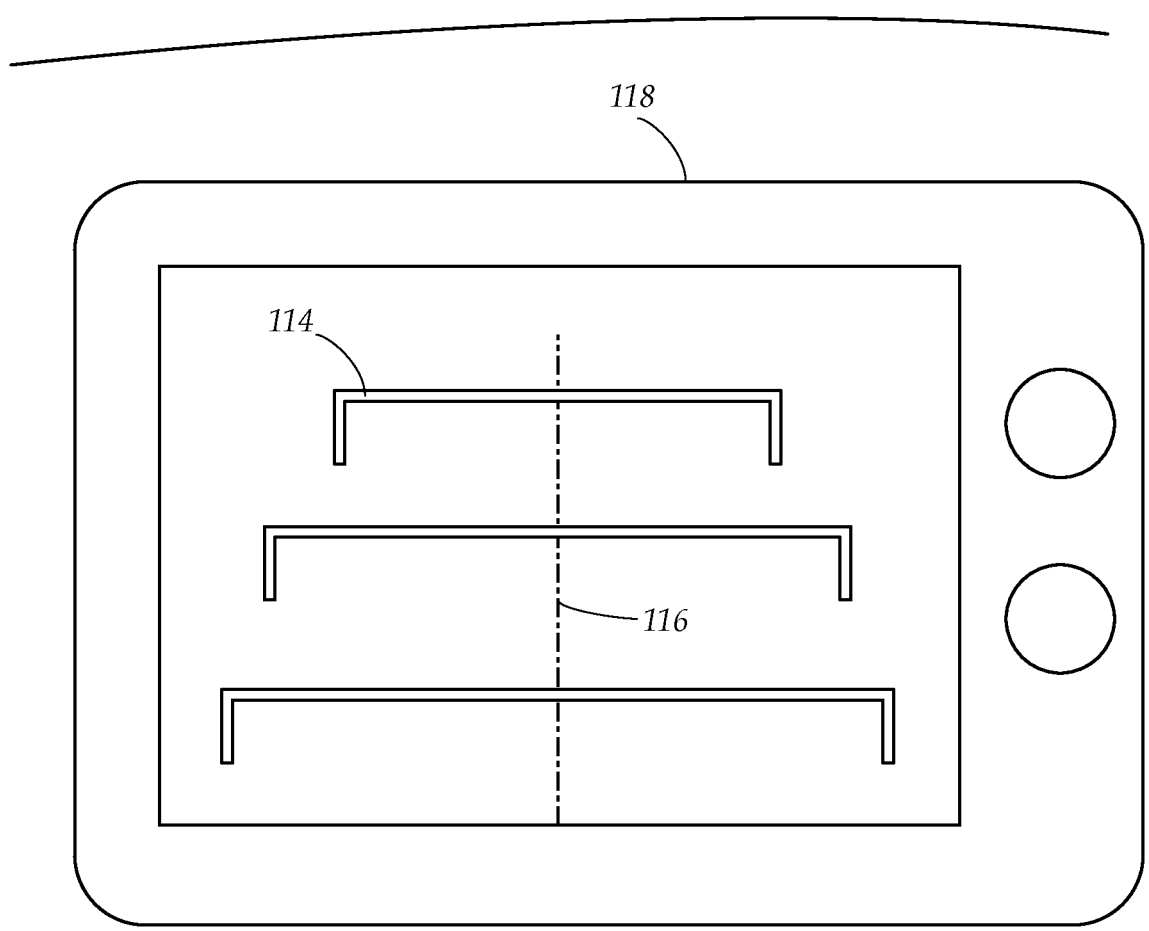
FIG. 20B is a diagrammatical front view of a calibrated back-up camera system, in accordance with an embodiment in the present disclosure.

Turning to FIGS. 20A-20B while also referring to FIG. 1A and FIG. 18, to assist in calibrating a rear-facing sensor 95, the target alignment system 10 may be utilized to locate a rear optimum target position 72R for the placement of a rear calibration target 109R. In a preferred embodiment, the first and second rear visual guide projectors 30C, 30D are detached from the first and second rear wheels 85L, 85R following the successful calibration of the front-facing sensor 94. The first rear visual guide projector 30C is instead reattached to the second rear wheel 85R, while the second rear visual guide projector 30D is reattached to the first rear wheel 85L. Both rear visual guide projectors are oriented to project the first and second rear visual guide lines 54L, 54R rearwardly past the vehicle rear 81R. The first and second target assemblies 40L, 40R are placed to the rear of the vehicle 80. The process for locating the rear optimum target position 109R is substantially identical to the process for locating the optimum target position 109. However, the first and second longitudinal guide lines 52L, 52R are omitted, and the first and second rear longitudinal lines 54L, 54R are used instead to longitudinally align the first and second target assemblies 40L, 40R respectively. Additionally, the transverse visual guide projector 38 is aligned with either the first or second rear longitudinal guide lines 54L, 54R. The placement and usage of the lateral alignment visual guide projector 34, the distance measuring projector 36, the thrust line target 60, the center visual guide projector 32, and the transverse visual guide projector 56 is otherwise substantially the same as described above.

Due to the limited distances and slow speeds involved when reversing the vehicle, it is unnecessary to utilize all four wheel-mounted visual guide projectors 30. In one embodiment where the rear-facing sensor 95 is a back-up camera, successful calibration may result in the rear thrust line 50R of the vehicle being matched with the vehicle center line 92, such that when the vehicle 80 is placed in reverse, the actual path 116 properly aligns with backup alignment indicators 114 displayed on the dashboard 118.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a target alignment system for calibrating a vehicle-mounted safety sensor. The disclosure is illustrated by example in the drawing figures, and throughout the written description. It should be understood that numerous variations are possible, while adhering to the inventive concept. Such variations are contemplated as being a part of the present disclosure.

What is claimed is:

1. A target alignment system for calibrating a safety sensor, the safety sensor is mounted upon a vehicle which is positioned upon a horizontal surface, the vehicle having a vehicle front, a vehicle first side, a vehicle second side, a vehicle rear, a pair of front wheels and a pair of rear wheels, and a vehicle center line that extends longitudinally and centrally through the vehicle, the front wheels comprising a first front wheel disposed at the vehicle first side and a second front wheel disposed at the vehicle second side, the rear wheels comprising a first rear wheel disposed at the vehicle first side and a second rear wheel disposed at the vehicle second side, the safety sensor having a calibration target and an optimum target position upon which placement of the calibration target allows accurate calibration of the safety sensor, the optimum target position corresponding to a location upon the horizontal surface, the target alignment system comprising:

a pair of target alignment assemblies comprising a first target assembly and a second target assembly, each target assembly having a target face, a longitudinal target alignment track, and a lateral target alignment track, the first and second target assemblies are positioned upon the horizontal surface ahead of the vehicle front, with the vehicle center line extending between the first and second target assemblies;

a plurality of wheel attachment assemblies having one or more grips and a visual guide attachment point, the grips allow each wheel attachment assembly to be detachably secured to one of the front or rear wheels;

a plurality of wheel-mounted visible guide projectors comprising a first front visual guide projector and a second front visual guide projector, the first front visual guide projector and the second front visual guide projector are each attached to the first front wheel and the second front wheel respectively via the visual guide attachment point of one of the wheel attachment assemblies, the first front visual guide projector is adapted to project a first longitudinal guide line while the second front visual guide projector is adapted to project a second longitudinal guide line, the first and second longitudinal guide lines are projected upon the horizontal surface parallel with the vehicle central line and extend forwardly past the vehicle front, the first and second longitudinal guide lines align with the longitudinal target alignment tracks of the first and second target assemblies respectively;

a lateral alignment guide projector positioned on the first or second target assemblies, the lateral alignment guide projector is adapted to project a lateral alignment guide line which aligns with the lateral target alignment guides of both the first and second target assemblies and places the target assemblies in lateral alignment with each other;

a thrust line target having a thrust line target lateral alignment track and a center guide line alignment mark oriented perpendicularly thereto, the thrust line target is positioned upon the horizontal surface with the center guide line alignment mark equidistant between the first and second longitudinal guide lines, and the thrust line target lateral alignment track is aligned with the lateral alignment guide line;

a center visual guide projector aligned with the center guide line alignment mark of the thrust line target, the center visual guide line projector is adapted to project a center guide which is colinear with the vehicle center line and extends along the horizontal surface towards the vehicle; and a transverse visual guide projector adapted to be aligned with a starting reference point positioned along either the first or second longitudinal guide line, the transverse visual guide projector projects a transverse guide line upon the horizontal surface which perpendicularly intersects the center guide line at an intersection point, the intersection point is separated from the starting reference point by a calibration distance, and corresponds to the optimum target position.

2. The target alignment system as described in claim 1, wherein:

the plurality of wheel-mounted visual guide projectors further comprises a first rear visual guide projector and a second rear visual guide projector, the first and second rear visual guide projectors are each attached to the first and second rear wheels respectively via the visual guide attachment point of one of the wheel attachment assemblies, the first and second rear visual guide projectors are adapted to forwardly project a first rear longitudinal guide line and a second rear longitudinal guide line to converge with the first and second longitudinal guide lines upon the horizontal surface, whereby convergence of the first longitudinal guide line and the first rear longitudinal guide line indicates longitudinal alignment of the first front and first rear wheels, and convergence of the second longitudinal guide line and the second rear longitudinal guide line indicates longitudinal alignment of the second front and second rear wheels.

3. The target alignment system as described in claim 2, wherein:

the longitudinal target alignment track of each target assembly further has a horizontal component which projects horizontally and perpendicularly away from the target face, and a vertical component which extends upwardly and perpendicularly away from the horizontal surface;

the first longitudinal guide line and the second longitudinal guide line each form a first vertical guide line and a second vertical guide line respectively upon intersecting the vertical component of one of the longitudinal target alignment tracks, and the first longitudinal guide line and the second longitudinal guide line each form a first rear vertical guide line and a second rear vertical guide line respectively upon intersecting the vertical component of one of the longitudinal target alignment tracks;

whereby the first target assembly is longitudinally aligned by converging the first longitudinal guide line and the first rear longitudinal guide line with the horizontal component of the first target assembly, and the second target assembly is longitudinally aligned by converging the second longitudinal guide line and the second rear longitudinal guide line with the horizontal component of the second target assembly; and whereby the first target assembly is leveled in relation to the horizontal surface by aligning the first vertical guide line and the first rear vertical guide line with the vertical component of the first target assembly, and the second target assembly is leveled in relation to the horizontal surface by aligning the second vertical guide line and the second rear vertical guide line with the vertical component of the second target assembly.

4. The target alignment system as described in claim 3, wherein:

the first front visual guide projector and the first rear visual guide projector are adapted to project a first horizontal guide line and a first rear horizontal guide line respectively upon the target face of the first target assembly, and the second front visual guide projector and the second rear visual guide projector are adapted to project a second horizontal guide line and a second rear horizontal guide line respectively upon the target face of the second target assembly; and whereby the first front wheel is level with the first rear wheel upon the horizontal surface when the first horizontal guide line is horizontally aligned with the first rear horizontal guide line upon the target face of the first target assembly, and the second front wheel is level with the second rear wheel upon the horizontal surface when the second horizontal guide line is horizontally aligned with the second rear horizontal guide line upon the target face of the second target assembly.

5. The target alignment system as described in claim 4, further comprising a distance measuring projector positioned upon either the first target assembly or the second target assembly and a distance target positioned upon the opposite target assembly, the distance measuring projector is adapted to project a distance measuring line to the distance target to determine a distance between the first and second longitudinal guide lines, the distance measuring line being parallel with the lateral alignment guide line; and the thrust line target has a thrust line distance target longitudinally aligned with the center guide line alignment mark, and the thrust line target is placed upon the horizontal surface such that the thrust line distance target intersects the distance measuring line at a distance measuring line midpoint which is equidistant between the first and second longitudinal guide lines.

6. The target alignment system as described in claim 5, wherein the transverse visual guide projector is further adapted to project a transverse projector alignment line perpendicularly away from the transverse guide line, the transverse guide line is maintained in perpendicular alignment with the first or second longitudinal guide line by aligning the transverse projector alignment line with the first or second longitudinal line.

7. A method for calibrating a safety sensor mounted upon a vehicle, the vehicle having a vehicle front, a vehicle first side, a vehicle second side, a vehicle rear, a pair of front wheels and a pair of rear wheels, and a vehicle center line that extends longitudinally and centrally through the vehicle, the front wheels comprising a first front wheel disposed at the vehicle first side and a second front wheel disposed at the vehicle second side, the rear wheels comprising a first rear wheel disposed at the vehicle first side and a second rear wheel disposed at the vehicle second side, the vehicle having a thrust line corresponding to a direction of travel dictated by a steering angle, the method comprising the steps of:

providing a pair of target assemblies comprising a first target assembly and a second target assembly, each target assembly having a target face, a longitudinal alignment track, and a longitudinal alignment track perpendicularly disposed in relation to the longitudinal alignment track;

providing a plurality of wheel-mounted visible guide projectors comprising a first front visual guide projector, a second front visual guide projector, a first rear visual guide projector, and a second rear visual guide projector;

providing a plurality of wheel attachment assemblies having a visual guide attachment point for holding one of the visual guide projectors, each wheel attachment assembly is adapted to be detachably secured to one of the front or rear wheels;

providing a center visual guide projector, a lateral alignment guide projector, and a transverse visual guide projector;

providing a calibration target for calibrating the safety sensor;

positioning the vehicle upon a horizontal surface;

adjusting the front and rear wheels so that the steering angle approaches zero degrees from the vehicle center line;

attaching the first front visual guide projector and the second front visual guide projector to the first front wheel and the second front wheel using the wheel attachment assemblies;

attaching the first rear visual guide projector and the second rear visual guide projector to the first rear wheel and the second rear wheel using the wheel attachment assemblies;

forwardly projecting a first longitudinal guide line upon the horizontal surface using the first front visual guide projector and a second longitudinal guide line using the second front visual guide projector;

forwardly projecting a first rear longitudinal guide line upon the horizontal surface using the first rear visual guide projector and a second rear longitudinal guide line using the second rear visual guide projector;

longitudinally aligning the first front wheel and the first rear wheel by aligning the first longitudinal guide line with the first rear longitudinal guide line to create a colinear first convergence;

longitudinally aligning the second front wheel and the second rear wheel by aligning the second longitudinal guide line with the second rear longitudinal guide line to create a colinear second convergence;

placing the first and second target assemblies forward of the vehicle front, and facing the lateral alignment guide line of each target assembly inwardly towards the vehicle center line;

longitudinally aligning the first target assembly by aligning the longitudinal alignment track of the first target assembly with the first convergence;

longitudinally aligning the second target assembly by aligning the longitudinal alignment track of the second target assembly with the second convergence;

laterally aligning the first and second target assemblies by using the lateral alignment guide projector to project a lateral alignment guide line upon the horizontal surface which aligns with the lateral target alignment tracks of the first and second target assemblies, such that the lateral alignment guide line is perpendicular to the first and second longitudinal guide lines;

causing the thrust line of the vehicle to align with the vehicle centerline as a result of the longitudinal alignment between the first convergence and the first target assembly, the longitudinal alignment between the second convergence and the second target assembly, and the lateral alignment between the first and second target assemblies;

locating a midpoint between the first and second target assemblies which is equidistant between the first and second longitudinal guide lines;

projecting a center guide line upon the horizontal surface using the center visual guide line projector, aligning the center guide line with the midpoint, and creating a convergence between the center guide line and the vehicle center line;

selecting either the first or the second longitudinal guide lines and designating a starting reference point along the selected longitudinal guide line, measuring a calibration distance from the starting reference point to locate an ending reference point along the selected longitudinal guide line;

projecting a transverse guide line using the transverse guide line projector, aligning the transverse guide line with the ending reference point and perpendicularly crossing the central guide line at an intersection point, the intersection point corresponding to an optimal target position; and placing the calibration target upon the optimal target position such that the calibration target faces the vehicle front, and initiating a calibration procedure by which the safety sensor is accurately calibrated.

8. The method as recited in claim 7, wherein each of the front wheels and rear wheels has a wheel center, and the step of laterally aligning the first and second target assemblies is followed by the steps of:

projecting a first horizontal guide line and a first rear horizontal guide line upon the target face of the first target assembly using the first front visual guide projector and the first rear visual guide projector respectively;

projecting a second horizontal guide line and a second rear horizontal guide line upon the target face of the second target assembly using the first front visual guide projector and the first rear visual guide projector respectively;

placing the wheel centers of the first front wheel and the first rear wheel in horizontally coplanar alignment by aligning the first horizontal guide line and the first rear horizontal guide line upon the target face of the first target assembly; and placing the wheel centers of the second front wheel and the second rear wheel in horizontally coplanar alignment by aligning the second horizontal guide line and the second rear horizontal guide line upon the target face of the second target assembly.

9. The method as recited in claim 8, wherein the longitudinal target alignment tracks of the first and second target assemblies each have a vertical component which projects upwardly, and the step of longitudinally aligning the second target assembly is followed by the steps of:

forwardly projecting a first vertical guide line and a first rear vertical guide line using the first front and first rear visual guide projectors respectively, and leveling the first target assembly in relation to the horizontal surface by aligning the first vertical guide line and the first rear vertical guide line with the vertical component of the first target assembly; and forwardly projecting a second vertical guide line and a second rear vertical guide line using the second front and second rear visual guide projectors respectively, and leveling the first target assembly in relation to the horizontal surface by aligning the second vertical guide line and the second rear vertical guide line with the vertical component of the second target assembly.

10. The method as recited in claim 9, wherein:

the step of providing a center visual guide projector is followed by the step of providing a thrust line target having a thrust line target lateral alignment track and a center guide line alignment mark oriented perpendicularly thereto;

the step of locating a midpoint between the first and second target assemblies is followed by the step of placing the thrust line target upon the horizontal surface between the first and second target assemblies, aligning the lateral alignment guide line with the thrust line lateral alignment track, and aligning the center guide line alignment mark with the midpoint; and the step of projecting a center guide line is preceded by the step of aligning the center guide line projector with the center guide line alignment mark of the thrust line target.

11. A method for calibrating a safety sensor mounted upon a vehicle, the vehicle having a vehicle front, a vehicle first side, a vehicle second side, a vehicle rear, a pair of front wheels and a pair of rear wheels, and a vehicle center line that extends longitudinally and centrally through the vehicle, the front wheels comprising a first front wheel disposed at the vehicle first side and a second front wheel disposed at the vehicle second side, the rear wheels comprising a first rear wheel disposed at the vehicle first side and a second rear wheel disposed at the vehicle second side, the vehicle having a thrust line corresponding to a direction of travel determined by the front and rear wheels, the method comprising the steps of:

providing a pair of target assemblies including a first target assembly and a second target assembly;

providing a plurality of wheel-mounted visible guide projectors comprising a first front visual guide projector, a second front visual guide projector, a first rear visual guide projector, and a second rear visual guide projector;

providing a lateral guide line projector, a center guide line projector, and a transverse guide line projector;

providing a calibration target for calibrating the safety sensor;

positioning the vehicle upon a horizontal surface;

attaching the first front visual guide projector and the second front visual guide projector to the first front wheel and the second front wheel, and attaching the first rear visual guide projector and the second rear visual guide projector to the first rear wheel and the second rear wheel;

placing the first and second target assemblies upon the horizontal surface ahead of the vehicle front;

forming a visible guide line perimeter around the vehicle by projecting a first longitudinal guide line and a first rear longitudinal guide line on the horizontal surface along the vehicle first side using the first front and first rear visual guide projectors respectively, projecting a second longitudinal guide line and a second rear longitudinal guide line on the horizontal surface along the vehicle second side using the second front and second rear visual guide projectors respectively, projecting a lateral guide line upon the horizontal surface between the first and second target assemblies using the lateral guide line projector, which perpendicularly crosses the longitudinal guide lines, and projecting a center guide line upon the horizontal surface using the center guide line projector positioned at a midpoint between the first and second longitudinal lines which is perpendicular to the colinear with the vehicle center line;

selecting either the first or the second longitudinal guide lines and designating a starting reference point along the selected longitudinal guide line, measuring a calibration distance from the starting reference point to locate an ending reference point along the selected longitudinal guide line, projecting a transverse guide line upon the horizontal surface which aligns with the ending reference point and perpendicularly intersects the center guide line to mark the optimum target position; and placing the calibration target upon the optimum target position, and initiating a calibration procedure by which the safety sensor is accurately calibrated.

12. The method as recited in claim 11, wherein the step of forming a visible guide line perimeter is followed by the step of:

confirming that the thrust line of the vehicle matches the center guide line by longitudinally aligning the first front wheel and first rear wheel by placing the first longitudinal guide line and the first rear longitudinal guide line in a colinear first convergence, longitudinally aligning the second front wheel and second rear wheel by placing the second longitudinal guide line and the second rear longitudinal guide line in a colinear second convergence, aligning the first convergence with the first target assembly, and aligning the second convergence with the second target assembly.

13. The method as recited in claim 12, wherein each target assembly has a target face, the front wheels and the rear wheels each have a wheel center and the step of forming a visible guide line perimeter is followed by the steps of:
projecting a first horizontal guide line and a first rear horizontal guide line upon the target face of the first target assembly using the first front visual guide projector and the first rear visual guide projector respectively, whereby the first horizontal guide line passes through the wheel center of the first front wheel and the first rear horizontal guide line passes through the wheel center of the first rear wheel;
projecting a second horizontal guide line and a second rear horizontal guide line upon the target face of the second target assembly using the first front visual guide projector and the first rear visual guide projector respectively, whereby the second horizontal guide line passes through the wheel center of the second front wheel and the second rear horizontal guide line passes through the wheel center of the second rear wheel;
placing the wheel centers of the first front wheel and the first rear wheel in horizontally coplanar alignment by aligning the first horizontal guide line and the first rear horizontal guide line upon the target face of the first target assembly; and
placing the wheel centers of the second front wheel and the second rear wheel in horizontally coplanar alignment by aligning the second horizontal guide line and the second rear horizontal guide line upon the target face of the second target assembly.

14. The method as recited in claim 13, wherein the step of placing the wheel centers of the second front wheel and the second rear wheel in horizontally coplanar alignment is followed by the step of:
adapting to irregularities upon the horizontal surface affecting the horizontal coplanar alignment of the front and rear wheels by inserting a leveling shim under one or more of the wheels.

\* \* \* \* \*